United States Patent
Anguelov et al.

(10) Patent No.: US 9,286,545 B1
(45) Date of Patent: *Mar. 15, 2016

(54) SYSTEM AND METHOD OF USING IMAGES TO DETERMINE CORRESPONDENCE BETWEEN LOCATIONS

(71) Applicant: Google Inc., Mountain View, CA (US)

(72) Inventors: Dragomir Anguelov, San Francisco, CA (US); Ehud Rivlin, Haifa (IL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,015

(22) Filed: Jul. 28, 2014

Related U.S. Application Data

(63) Continuation of application No. 14/100,175, filed on Dec. 9, 2013, now Pat. No. 8,938,091, which is a continuation of application No. 13/746,775, filed on Jan. 22, 2013, now Pat. No. 8,655,012, which is a continuation of application No. 12/431,045, filed on Apr. 28, 2009, now Pat. No. 8,385,591.

(51) Int. Cl.
| | |
|---|---|
| *G06K 9/00* | (2006.01) |
| *G06K 9/62* | (2006.01) |
| *G06K 9/46* | (2006.01) |
| *G08G 1/123* | (2006.01) |

(52) U.S. Cl.
CPC ............ *G06K 9/6212* (2013.01); *G06K 9/0063* (2013.01); *G06K 9/4647* (2013.01)

(58) Field of Classification Search
CPC .................................... G06K 9/00; G06T 7/00
USPC ................. 382/100, 103, 104, 107, 190, 219; 340/661, 995.1, 995.15, 995.19; 701/408, 484, 487.51
See application file for complete search history.

(56) References Cited

U.S. PATENT DOCUMENTS

| | | | |
|---|---|---|---|
| 6,075,905 A | 6/2000 | Herman et al. | |
| 6,377,257 B1 | 4/2002 | Borrel et al. | |
| 6,453,056 B2 | 9/2002 | Laumeyer et al. | |
| 6,522,787 B1 | 2/2003 | Kumar et al. | |
| 6,956,573 B1 | 10/2005 | Bergen et al. | |
| 7,127,068 B2 * | 10/2006 | Sundaravel et al. | ........... 380/258 |
| 7,359,797 B2 | 4/2008 | Dorfman et al. | |
| 8,131,118 B1 | 3/2012 | Jing et al. | |

(Continued)

FOREIGN PATENT DOCUMENTS

| | | |
|---|---|---|
| EP | 2315075 A1 | 4/2011 |
| WO | 2013181032 A2 | 12/2013 |

OTHER PUBLICATIONS

Aude Oliva and Antonio Torralba, Building the Gist of a Scene: The Role of Global Image Features in Recognition; Progress in Brain Research, vol. 155, 2006 (16 pages).

(Continued)

*Primary Examiner* — Abolfazl Tabatabai
(74) *Attorney, Agent, or Firm* — Lerner, David, Littenberg, Krumholz & Mentlik, LLP

(57) ABSTRACT

In one aspect, a system and method is provided that matches images that are associated with street addresses with images that are associated with locations that are stored with respect to another reference system, such as latitude/longitude. If the images match, the street address is associated with the location. In a further aspect, text contained in the images is extracted and associated with the street address as well.

20 Claims, 22 Drawing Sheets

(56) References Cited

U.S. PATENT DOCUMENTS

| | | | | |
|---|---|---|---|---|
| 8,364,393 B2 * | 1/2013 | DeLuca | ............. | G01C 21/3623 701/409 |
| 8,385,591 B1 | 2/2013 | Anguelov et al. | | |
| 8,447,136 B2 | 5/2013 | Ofek et al. | | |
| 8,472,664 B1 * | 6/2013 | Jing | ................ | G01C 21/20 382/100 |
| 8,515,207 B2 * | 8/2013 | Chau | ................ | G06F 17/30265 33/320 |
| 8,593,485 B1 | 11/2013 | Anguelov et al. | | |
| 8,605,133 B2 | 12/2013 | Lampotang et al. | | |
| 8,666,112 B1 * | 3/2014 | Jing et al. | .................... | 382/100 |
| 8,938,091 B1 * | 1/2015 | Anguelov | ......... | G06F 17/30241 340/988 |
| 2003/0191694 A1 | 10/2003 | Vonfeldt et al. | | |
| 2004/0125133 A1 | 7/2004 | Pea et al. | | |
| 2005/0162523 A1 | 7/2005 | Darrell et al. | | |
| 2005/0283730 A1 | 12/2005 | Uyttendaele et al. | | |
| 2007/0173956 A1 | 7/2007 | Koch et al. | | |
| 2007/0255725 A1 | 11/2007 | McCoach | | |
| 2008/0002916 A1 | 1/2008 | Vincent et al. | | |
| 2008/0106593 A1 | 5/2008 | Arfvidsson et al. | | |
| 2008/0253685 A1 | 10/2008 | Kuranov et al. | | |
| 2010/0004995 A1 | 1/2010 | Hickman | | |
| 2010/0118025 A1 | 5/2010 | Smith et al. | | |
| 2010/0123737 A1 | 5/2010 | Williamson et al. | | |
| 2010/0293173 A1 | 11/2010 | Chapin et al. | | |
| 2011/0143779 A1 | 6/2011 | Rowe et al. | | |
| 2011/0267369 A1 | 11/2011 | Olsen | | |
| 2013/0069944 A1 | 3/2013 | Altman et al. | | |
| 2013/0155181 A1 | 6/2013 | Williams et al. | | |
| 2013/0223744 A1 | 8/2013 | Ramanujapuram et al. | | |
| 2014/0180571 A1 | 6/2014 | Kimchi et al. | | |

OTHER PUBLICATIONS

Hartmut Neven, Geordie Rose and William G. Macready, Image Recognition With an Adiabatic Quantum Computer: I. Mapping to Quadratic Unconstrained Binary Optimization; Apr. 28, 2008, pp. 1-7.

http://www.gigapan.org/index.php, printed May 4, 2009.

http://www.ogleearth.com/2007/10/earthmine_or_th.html, printed May 4, 2009.

ICCV 2005 Computer Vision Contest, http:/research.microsft.com/en-us/um/people/szelisk/VisionContest . . . , printed May 21, 2012.

Masakatsu Kourogi, Takeshi Kurata, Katsuhiko Sakaue, A Panorama-based Method of Personal Positioning and Orientation and Its Real-time Applications for Wearable Computers, ISWC2001 in Zurich, Switerland, pp. 107-114, 2001.

Masakatsu Kourogi, Takeshi Kurata, Katsuhiko Sakaue, Yoichi Muraoka, Improvement of panorama-based annotation overlay using omnidirectional vision and inertial sensors, 2000, pp. 183-184, IEEE.

Pages from gawker.com website, article entitled "What Movies Are Currently Playing on Google Street View?" accessed Apr. 24, 2012, 10:28 a.m. (6 pages).

Song, D., Y. Xu, N. Qin, Aligning windows of live video from an imprecise pan-tilt-zoom camera into a remote panoramic display for remote natue observation, J. Real-Time Image Proc (2010) 5:57-70, DOI 10.1007/s11554-009-0127-z.

* cited by examiner

SYSTEM AND METHOD OF USING IMAGES TO DETERMINE CORRESPONDENCE BETWEEN LOCATIONS

CROSS-REFERENCE TO RELATED APPLICATIONS

The present application is a continuation U.S. patent application Ser. No. 14/100,175, filed Dec. 9, 2013, which is a continuation of U.S. patent application Ser. No. 13/746,775, filed Jan. 22, 2013, and issued as U.S. Pat. No. 8,655,012, which is a continuation of U.S. patent application Ser. No. 12/431,045, filed Apr. 28, 2009, and issued as U.S. Pat. No. 8,385,591, the disclosures of which are incorporated herein by reference.

BACKGROUND OF THE INVENTION

Services such as Google Maps are capable of displaying street level images of geographic locations. These images, identified in Google Maps as "Street Views", typically comprise photographs of buildings and other features and allow a user to view a geographic location from a person's perspective as compared to a top-down map perspective.

When a street level image is taken, it is typically associated with a location, such as the latitude/longitude position of the camera and camera angle. While a street address may be inferred from a latitude/longitude position, the information is not always accurate.

The difficulty inherently arises from the different ways that one may refer to the locations of geographic objects.

Just one possible reference system relates to expressing locations as street addresses, that is, with respect to a particular street that is identified by its name or some other identifier such as "Amphitheatre Parkway Mountain." Street addresses may identify additional information such as a designated position along the street (e.g., a house number or street number such as "1600 Amphitheatre Parkway"), the geographic region in which all or a portion of the street resides (e.g., city, state or province, country or zip code) and other information as well (e.g., apartment number).

Another reference system expresses locations with respect to a fixed reference point of the Earth. By way of example, geographic locations may be expressed with respect to their latitude/longitude positions such as (37° 25' 38", −122° 5' 57"). The latitude/longitude reference system may also express latitude/longitude position in fractions of degrees and include a reference to altitude if indicating height.

Landmarks can also be reference points. For example, the Empire State Building is at a fixed point on the Earth. In fact, less developed and rural areas sometimes lack street names. Accordingly, locations sometimes refer to distances and directions from landmarks such as "1 kilometer south of the Main Street Theatre" or "travel 300 meters south, and then 400 meters west, of the Main Street Theatre."

Yet another common reference system expresses locations with respect to parcels of land. For example, New York City has defined each parcel of land in accordance with a unique set of 3 numbers that comprise its borough, block, and lot (BBL) designation.

The foregoing list of reference systems is by way of example and not limitation. For example, a computer may both identify, and request more information about, a location by determining the point at which a user clicked on a map. Moreover, a geographic location may be expressed not as a single point but also as a range.

Geocoders are routines used to convert locations identified in accordance with one reference system into locations identified by another reference system. For example, a computer may convert street addresses to latitude/longitude positions and vice versa, such as converting "1600 Amphitheatre Parkway, Mountain View, Calif." to "(latitude 37.423021°, longitude −122.083939)".

Although locations are capable of being expressed with respect to multiple reference systems, a geocoding routine may not have all of the information necessary to perform a precise conversion. Accordingly, a geocoding routine may make an approximation based on the information it has. For example, assume a geocoding routine has access to data that pairs some latitude/longitude and street address positions, such as pairing "1 Second Street" with (37.00000°, −122.00000°) and "1000 Second Street" with (37.02000°, −122.02000°). To approximate the latitude/longitude of "500 Second Street", which is halfway between the two known street addresses, the geocoder may assume the latitude/longitude occurs halfway between the two known latitude/longitude positions, namely (37.01000°, −122.01000°).

Goecoding approximations are often inaccurate. For example, houses may be much closer to one another at one of the street versus the other end of the street, resulting in an uneven distribution of house numbers along the street. Moreover, the data available to the geocoding routine may be inaccurate, meaning that approximations based on such data will be similarly inaccurate.

BRIEF SUMMARY OF THE INVENTION

One aspect of the present disclosure provides a method that includes obtaining a first geographic image associated with a first location and first data extracted from the first geographic image that describes the first location. The first geographic image may represent a geographic object at the first location. A second geographic image may be selected with a processor from a set of geographic images. This set may contain a plurality of images. Based on a proximity of a location to the first location and in response to a request from a user, the second geographic image may be selected. A similarity value may be determined with the processor based on a visual similarity of the first image to the second image In this regard, determining the similarity value may include identifying features in the first and second geographic image and comparing a shape and position of one or more features in the first and second geographic images. The similarity value relates to a number of matches of the one or more features of the first and second geographic images.

In one example, the first data is a street address. In another example, the first geographic image is obtained from a source of real estate listings. The source of real estate listings is a real estate website and the first data is a street address. In yet another example, the first geographic image is obtained from a website and the first data is a street address. In this regard, the website may be associated with a restaurant or with a hotel.

Another method in accordance with a different aspect includes obtaining a first image of a geographic object. The first image may be associated with a street address. A first latitude/longitude position of the street address may be estimated with a processor and a second image of a geographic object based on the first latitude/longitude position may be obtained. The second image may be within a given threshold area of the first latitude/longitude position. The method also includes determining, with the processor, whether the geographic object in the first image corresponds with the geographic object in the second image based a comparison of visual features of the geographic object in the images. Upon determining that the first and second images correspond, the method may include determining a second latitude/longitude position of the second image and associating the second latitude/longitude position with the street address.

Yet another method in accordance with a different aspect includes comparing, with a processor, a geographic object in a first image with a geographic object in a second image based on visual features of the geographic object in the images. A latitude/longitude position of a street address may be determined based on a result of the comparison with the processor. The method also includes determining, with the processor, whether the second image contains text. Upon determining that the second image contains text, the method may include associating the text with the street address and modifying a listing associated with the street address based on the text.

BRIEF DESCRIPTION OF THE DRAWINGS

FIG. 21 is a flowchart.

DETAILED DESCRIPTION

In one aspect, the system and method matches images that are associated with street addresses with street level images that are associated with latitude/longitude coordinates in order to better align the street level images with the street addresses. The images associated with street addresses may be obtained from real estate sites. In a further aspect, text that is found on a geographic object in the street level image, such as store hours on a building, are added to the listing information of the business located in the building.

Figure 1:
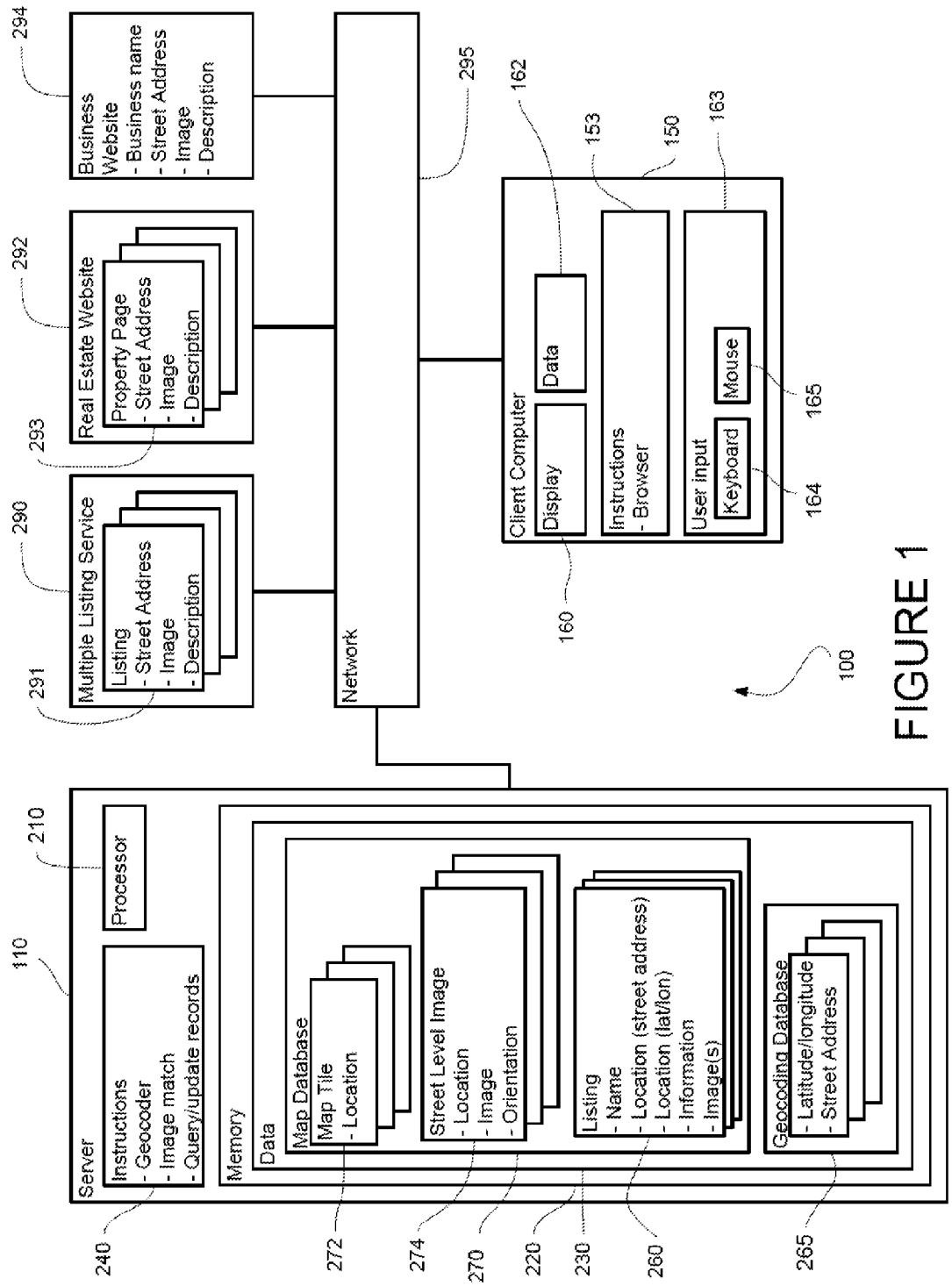
FIG. 1 is a functional diagram of a system in accordance with an aspect of the invention.
Figure 2:
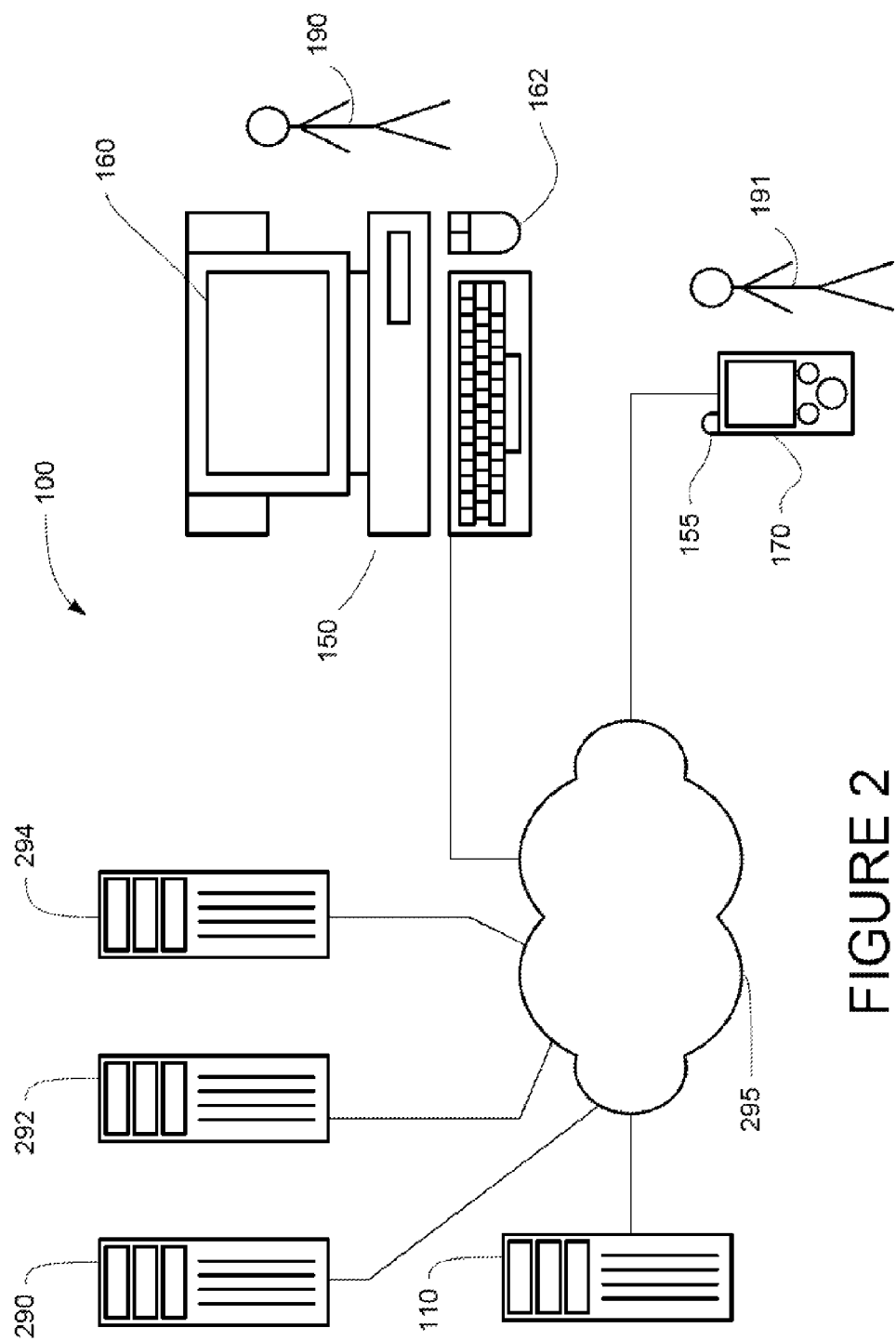
FIG. 2 is a pictorial diagram of a system in accordance with an aspect of the invention.

As shown in FIGS. 1-2, a system 100 in accordance with one aspect of the invention includes a computer 110 containing a processor 210, memory 220 and other components typically present in general purpose computers.

Memory 220 stores information accessible by processor 210, including instructions 240 that may be executed by the processor 210. It also includes data 230 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 210 may be any well-known processor, such as processors from Intel Corporation or AMD. Alternatively, the processor may be a dedicated controller such as an ASIC.

The instructions 240 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 230 may be retrieved, stored or modified by processor 210 in accordance with the instructions 240. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, computer 110 is a server communicating with one or more client devices 150-51 (only client device 150 being shown in FIG. 1 for clarity). For example, computer 110 may be a web server.

Each client device 150-51 may be configured similarly to the server 110, with a processor, memory and instructions. Each client device 150-51 is further intended for use by a person 190-191, respectively, such as having all of the internal components normally found in a personal computer. By way of example only, each client device may include a central processing unit (CPU), display device 160 (for example, a monitor having a screen, a projector, a touch-screen, a small LCD screen, a television, or another device such as an electrical device that is operable to display information processed by the processor), CD-ROM, hard-drive, user input 163 (for example, a keyboard 164, mouse 165, touch-screen or microphone), speakers, modem and/or network interface device (telephone, cable or otherwise) and all of the components used for connecting these elements to one another.

Although the client devices 150-51 may comprise a full-sized personal computer, the system and method may also be used in connection with mobile devices capable of wirelessly exchanging data. For example, client device 151 may be a wireless-enabled PDA, such as a Blackberry phone, or an Internet-capable cellular phone. In either regard, the user may input information using a small keyboard (in the case of a Blackberry phone), a keypad (in the case of a typical cell phone), a touch screen (in the case of a PDA) or any other means of user input. In various aspects, the client devices and computers described herein may comprise any device capable of processing instructions and transmitting data to and from humans and other devices and computers including general purpose computers, network computers lacking local storage capability, game consoles, and set-top boxes for televisions.

Client devices 150-51 may include a component, such as circuits, to determine the geographic location of the device. For example, mobile device 151 may include a GPS receiver 155. By way of further example, the component may include software for determining the position of the device based on other signals received at the mobile device 151, such as signals received at a cell phone's antenna from one or more cell phone towers if the mobile device is a cell phone. In that regard, the provision of location identification data may occur automatically based on information received from such a component.

The server 110 and client devices 150-51 are capable of direct and indirect communication, such as over a network 295. Although only a few computers are depicted in FIGS. 1-2, it should be appreciated that a typical system can include a large number of connected computers, with each different computer being at a different node of the network 295. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

Map database 270 of server 110 stores map-related information, at least a portion of which may be transmitted to a client device. For example, map database 270 may store map tiles 272, where each tile is a map image of a particular geographic area. Depending on the resolution (e.g., whether the map is zoomed in or out), one tile may cover an entire region, such as a state, in relatively little detail. Another tile may cover just a few streets in high detail. The map information is not limited to any particular format. For example, the images may comprise street maps, satellite images, or a combination of these, and may be stored as vectors (particularly with respect to street maps) or bitmaps (particularly with respect to satellite images). The various map tiles are each associated with geographical locations, such that the server 110 is capable of selecting, retrieving and transmitting one or more tiles in response to receipt of a geographical location. In one aspect, the locations are stored with respect to latitude/longitude.

Figure 4:
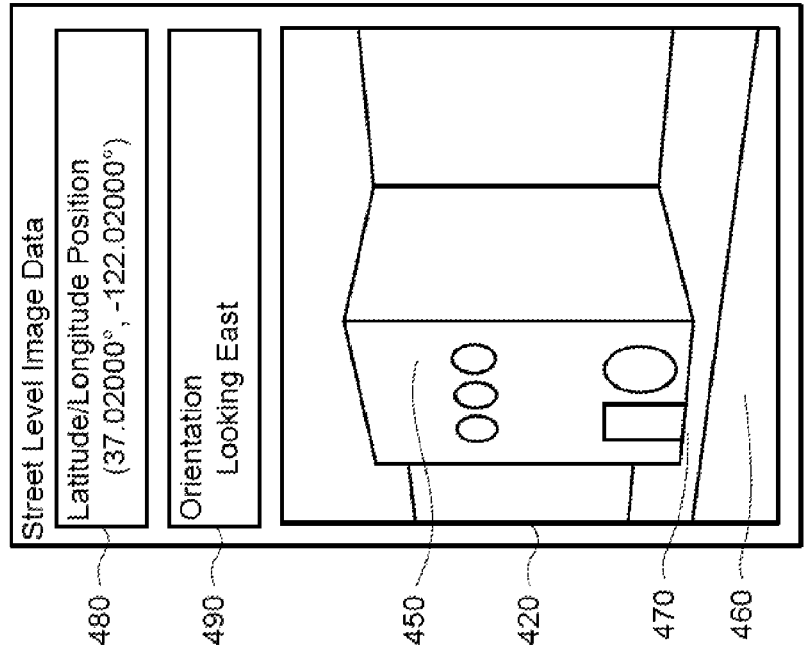
FIG. 4 is a functional diagram of street level image data, including a street level image that was captured by a camera.
Figure 3:
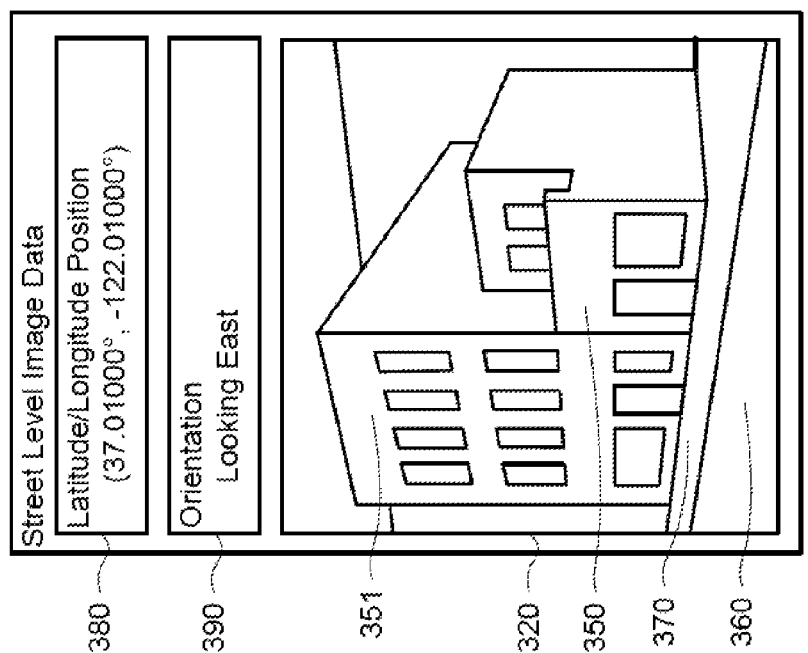
FIG. 3 is a functional diagram of street level image data, including a street level image that was captured by a camera.

The map database may also store data representing street level images 274. Street level images comprise images of objects at geographic locations, captured by cameras at geographic locations, in a direction generally parallel to the ground. Thus, as shown in FIGS. 3-4, street level images 320 and 420 may represent various geographic objects such as buildings 350-351 and 450, sidewalks 370 and 470, and streets 360 and 460, respectively, from a perspective of a few feet above the ground and looking down the street. It will be understood that while street level images 320 and 420 only show a few objects for ease of explanation, a typical street level image will contain as many geographic objects (street lights, mountains, trees, bodies of water, vehicles, people, etc.) in as much detail as the camera was able to capture.

The street level image may be captured by a camera mounted on top of a vehicle at or below the legal limit for vehicle heights (e.g., 7-14 feet) from a camera angle pointing roughly parallel to the ground. Street level images are not limited to any particular height above the ground, for example, a street level image may be taken from the top of building. Panoramic street-level images may be created by stitching together a plurality of photographs taken from different camera angles.

Each street level image may be represented as a set of pixels associated with color and brightness values. For example, if the images are stored in JPEG format, the image will be displayed as a set of pixels in rows and columns, with each pixel being associated with a value that defines the color and brightness of the image at the pixel's location.

Street level image data 274 further associates each street level image with a location, typically the latitude/longitude position of the camera when the image was captured. In that regard, street level image data 374 and 474 associate street level image 320 and 420 with latitude/longitude positions 380 and 480, respectively.

In addition to being associated with geographic locations, street level images 274 are typically associated with information indicating the orientation of the image. For example, if the street level image comprises a typical photograph, orientation data 390 and 490 may store the camera angle as data representing an angle that is 90° east of true north and rises 2° from ground level (shown as simply "Looking East" in the figures). If the street level images are panoramic images, such as 360° panoramas centered at the geographic location associated with the image, the orientation may indicate the portion of the image corresponding with looking due north from the camera position at an angle directly parallel to the ground.

Street level images may also be stored in the form of videos, such as by displaying MPEG videos captured by an analog video camera or displaying, in succession, time-sequenced photographs that were captured by a digital still camera.

As shown in FIG. 1, instructions 240 also include a geocoding routine that relies on data contained in geocoding database 265 to convert geographic locations from one reference system to another. Although the system and method is not limited to any particular set of reference systems, the system and method is particularly advantageous when used to address discrepancies between street addresses and references to a point on the Earth such as latitude/longitude positions. Accordingly, for ease of understanding and not by limitation, it will be assumed that all locations of system 100 are expressed as either street addresses or latitude/longitude positions.

Map database 270 may also store listing information identifying local businesses or other objects or features associated with particular geographic locations. For example, each listing 274 may be associated with a name, a category (such as "pizza", "Italian restaurant" or "ballpark"), other information (such as food on a menu) and a location. The location may be expressed with respect to a street address, a latitude/longitude position, or both. The database may be compiled by automatically gathering business information (such as from websites or telephone directories), or users may enter or edit the listing information themselves via web pages served by the server 110.

In many cases, there will be a single listing 274 in the map database 270 for each different business. However, it will be understood that the same business may be associated with many different listings, and that a single listing may be associated with many different businesses.

Listings may include other geographically-located objects in addition to or instead of businesses. For example, they may also identify homes, landmarks, roads, bodies of land, the current position of a car, items located in a store, etc. Therefore, references to business listings will be understood as examples only, and not a limitation on the type of listings that may be the subject of the system and method.

In addition to the street level images 274, system 100 includes other sources of images that are associated with geographic locations. These sources may be stored at the server 110 or, as shown in FIG. 1, may comprise external sources such as websites at different domains than the domain of server 110.

Figure 5:
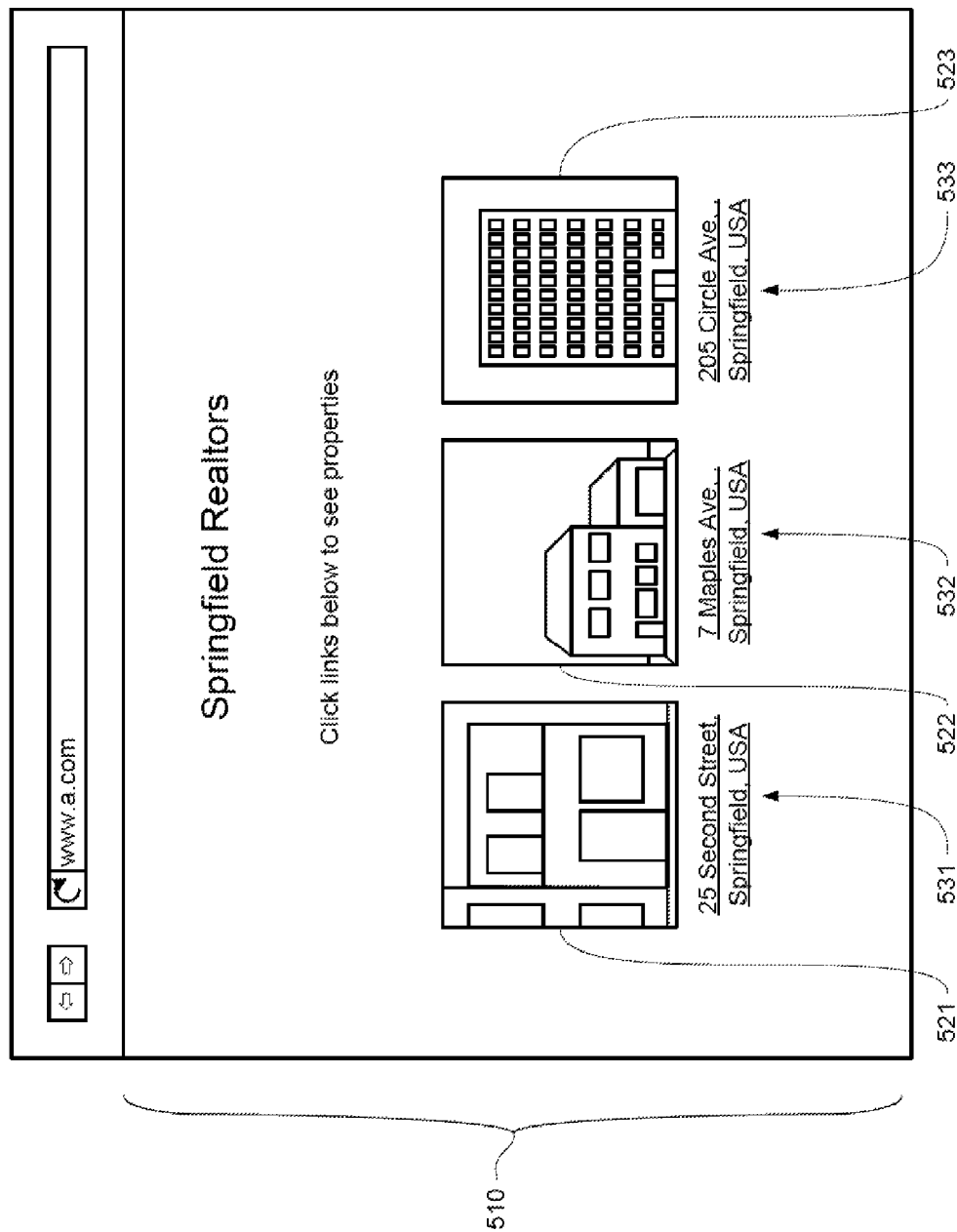
FIG. 5 is a screen shot of a source of images associated with street addresses.
Figure 6:
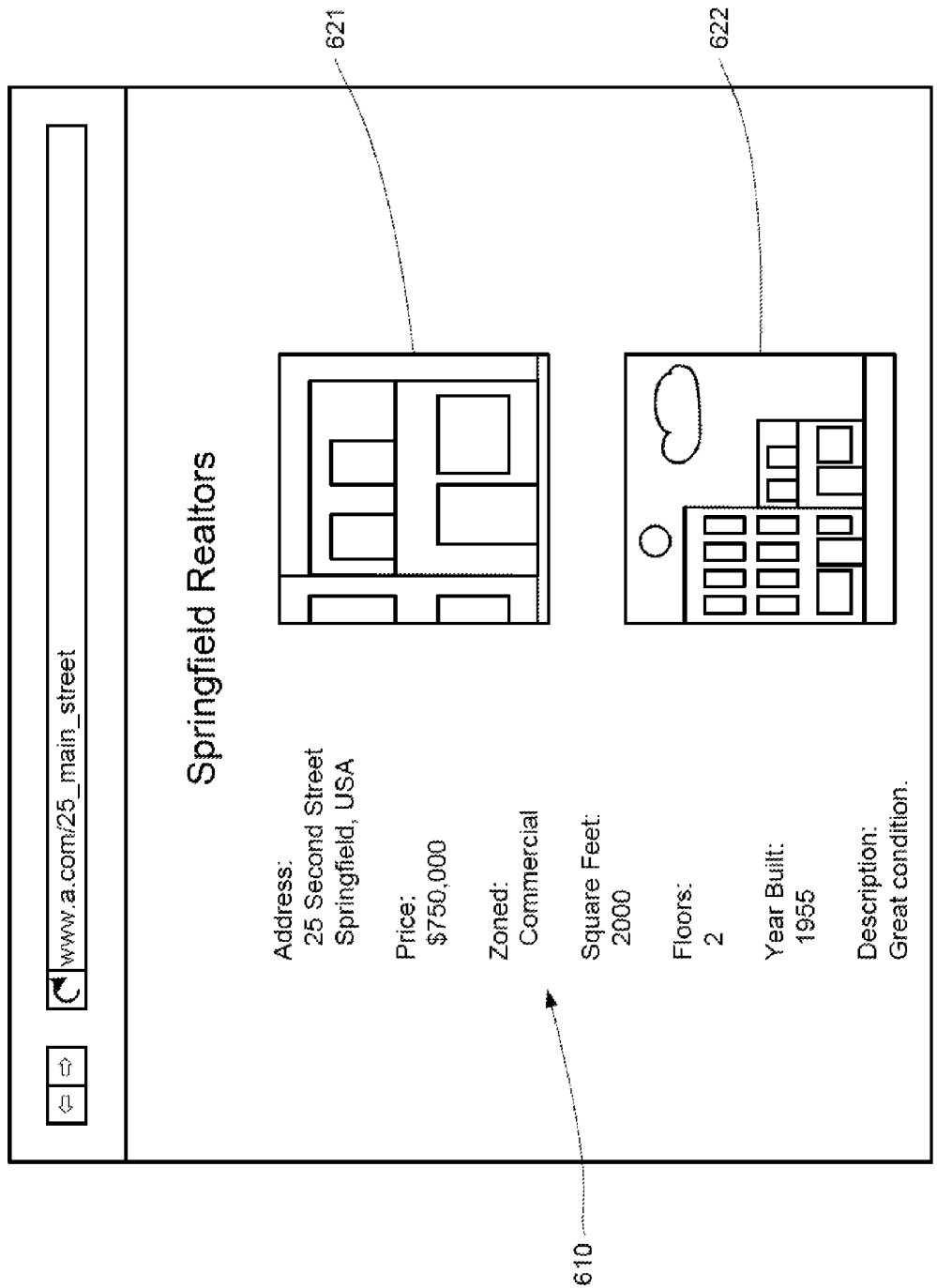
FIG. 6 is a screen shot of a source of images associated with a street address.

One possible external source of images linked to geographic locations is real estate web server 292, which provides web pages 293 containing images of properties for sale. As shown in FIG. 5, the home page 510 of the real estate site may provide photos 521-23 of different buildings and the street addresses 531-33 of those buildings. Moreover, as shown in FIG. 6, the server may provide additional information 610 about the building, such as its price and size, on its website. It may also provide multiple views of the building including a close-up 620 and an image 621 taken from relatively far away.

Another source of location-linked images may include Multiple Listing Service (MLS) server 290. MLS server 290 contains electronically accessible records 291 of real estate listings. In addition to providing a street address and description of the property, many of the records may include photographs of the structures on the property.

Figure 7:
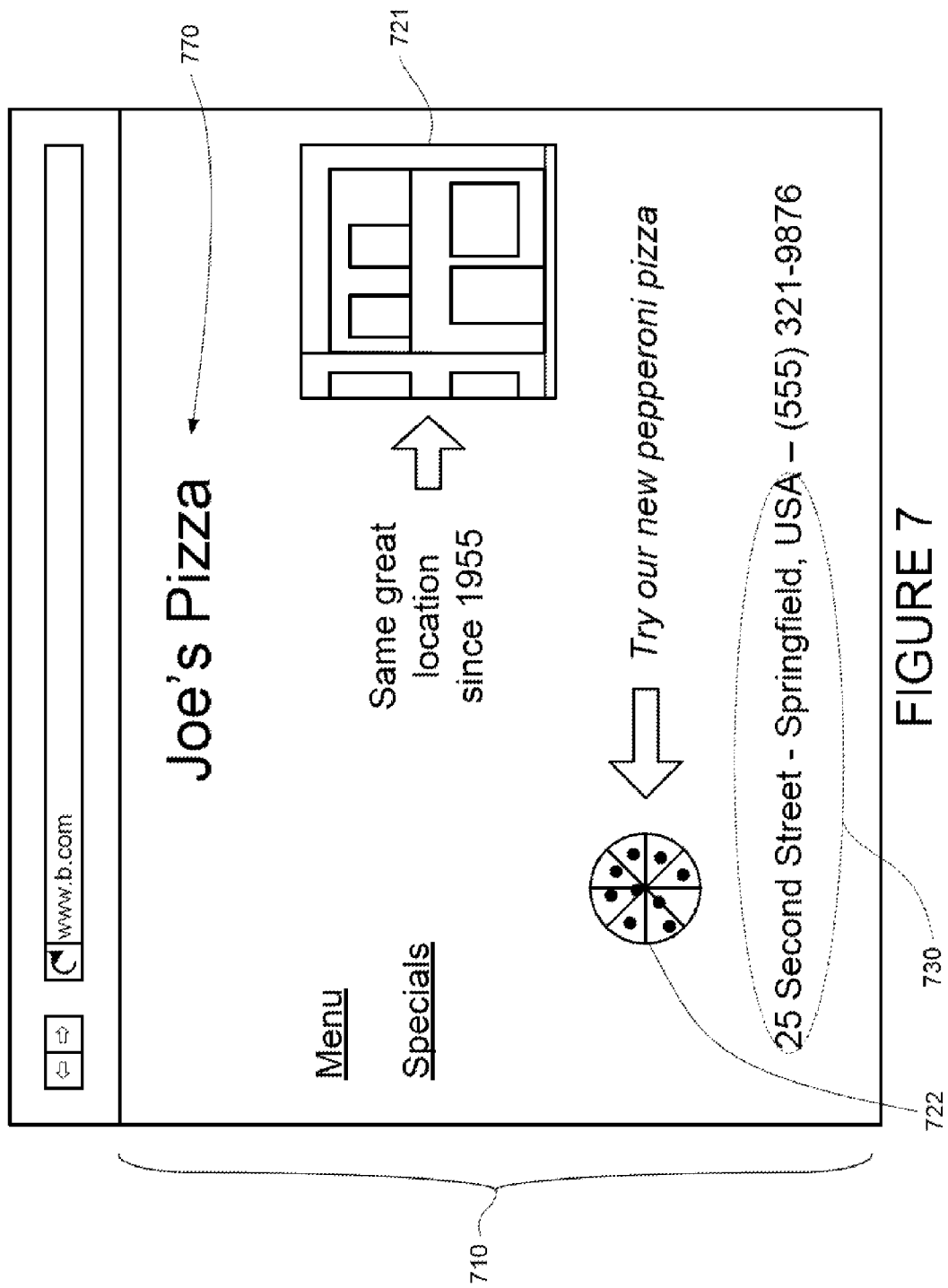
FIG. 7 is a screen shot of a source of an image associated with a street address.

Sources other than real estate websites may provide similar information. For example, website 294 may be associated with any business. As shown in FIG. 7, the business may be a pizzeria that has posted both its address 730 and a picture 721 of its building on its webpage 710. The site may contain other images that are not associated with locations, such as image 722. Hotels may also be good source of photos.

In addition to the operations illustrated in FIGS. 20-23, various operations in accordance with a variety of aspects of the invention will now be described. It should be understood that the following operations do not have to be performed in the precise order described below. Rather, various steps can be handled in reverse order or simultaneously.

The system and method may start by finding images associated with street addresses. For example, server 110 may access sources that are known to provide data that clearly links particular images of structures with street addresses. In that regard, server 110 may download records from MLS server 290.

Similarly, server 110 may check sources that are likely to associate images of geographic objects with street addresses, such as real estate website 292. In that regard, server may crawl and parse the website. As shown in FIG. 5, some pages may show more than one image and street address, in which case the server 110 may attempt to determine they are sufficiently associated with each other, such as by determining whether the address and image are displayed in close proximity or link to the same page. As shown in FIG. 6, the server may have a high degree of confidence that the images 621-22 show objects at the street address contained in text 610 because the site is associated with a realtor and there is only one street address (other than perhaps the realtor's) on the page.

Server 110 may also check sources that may associate images of geographic objects and street addresses. In that regard, as shown in FIG. 7, server 110 may screen scrape the web page 710 for both a street address 730 and images 721-22. However, many if not most images on websites will not show objects associated with street addresses. For example, image 722 represents a product, not a geographic structure. Accordingly, to the extent server 110 checks such websites, it may apply a variety of criteria to determine whether an image should be considered to represent geographic objects at a street address.

Figure 8:
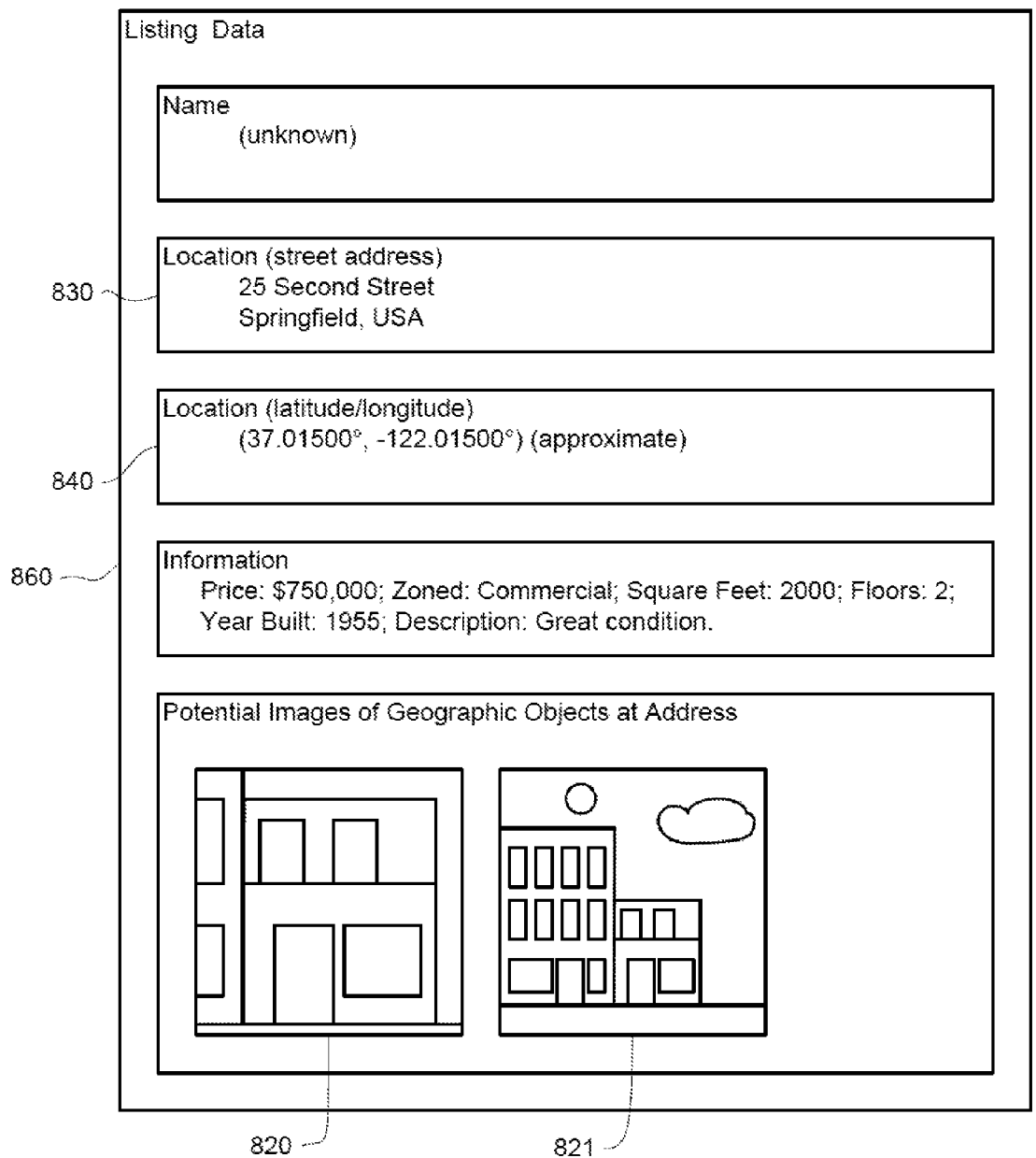
FIG. 8 is a functional diagram of listing data.

When the server 110 finds one or images associated with a street address, it may create a permanent or temporary listing 260 that associates the street address with the image(s). For example, FIG. 8 illustrates listing data 860 that identifies the information obtained from the real estate property web page from FIG. 6. The listing identifies the street address 830 and the images 820-21 that are assumed to show the objects at the address. The geocoder is also used to approximate a latitude/longitude position based on the street address.

The system and method then compares the images that are known or assumed to represent geographic objects at a particular street address (hereafter "known address images") with images that are known or assumed to represent geographic objects at particular latitude/longitude positions (hereafter "known latitude/longitude images").

In that regard and in one aspect, the system and method selects a known address image, estimates its approximate latitude/longitude position, and selects one or more images from a set of known latitude/longitude images. The known latitude/longitude images are selected based on whether their latitude/longitude locations are proximate to the estimated position. In yet another aspect, all or a portion of the images that are known to be associated with a particular street may also be compared with the known address images. The system and method may use a variety of proximity criteria.

Figure 9:
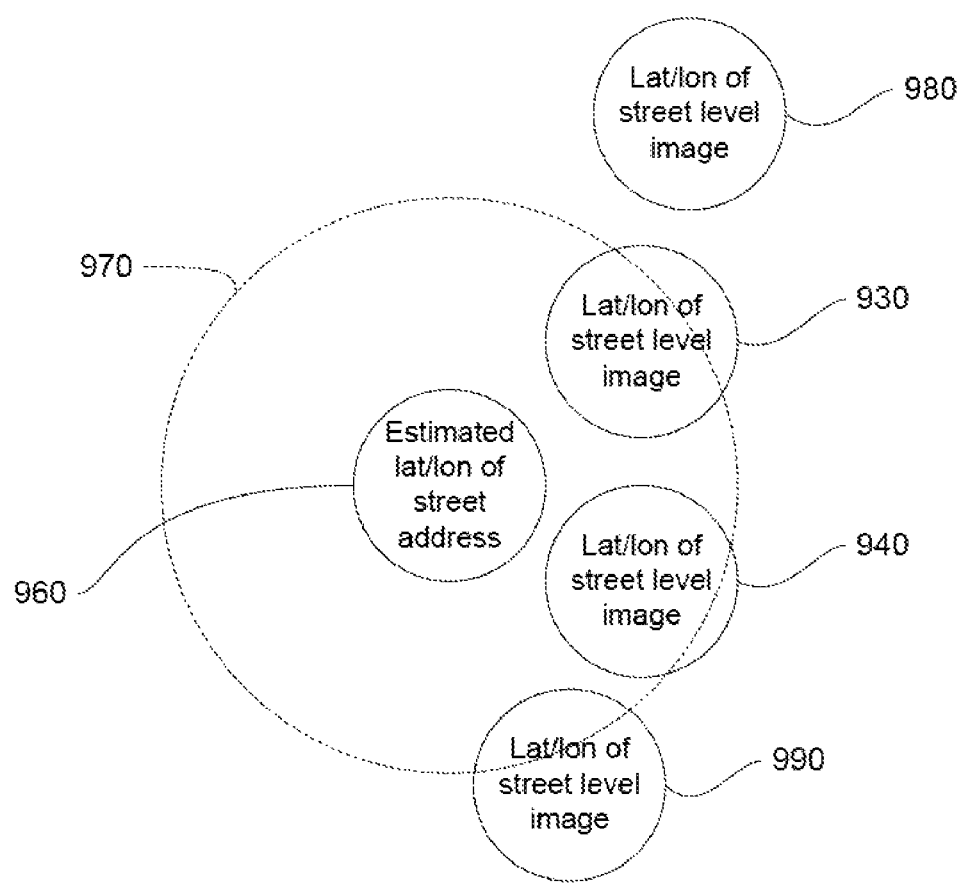
FIG. 9 is a functional diagram of the latitude/longitude location of street level images and the estimated latitude/longitude of a street level address.

As shown in FIG. 9, the server may thus select listing 860, which was created based on information obtained from a real estate website. The server determines the listing's estimated latitude/longitude position 960, such as (37.01500°, −122.01500°), from the listing's street address. The server then queries the street level image database for street level images having locations that are within a predefined range 970 of the estimated position, such as all images within a given threshold expressed in meters. In response, the server selects the two closest street level images 930 and 940. These images have latitude/longitude positions (37.01000°, −122.01000°) and (37.02000°, −122.02000°) and are associated with the data shown in FIGS. 3 and 4, respectively. Although the other street level images 980 and 990 are not selected, the range 970 may be expanded to include other images if no matches are found based on the closest street level images.

It will be understood that a variety of combinations of the foregoing may occur as well, such as selecting from a set of known address images based on an address approximated from a known latitude/longitude image.

After the known address images and known latitude/longitude images are selected, the selected images are compared to determine whether any of the known address images match known latitude/longitude images. In that regard, the images may be compared and assigned a value that is based on the amount of visual similarity. FIGS. 10-13 illustrate just one possible system and method for checking for a match.

Figure 10:
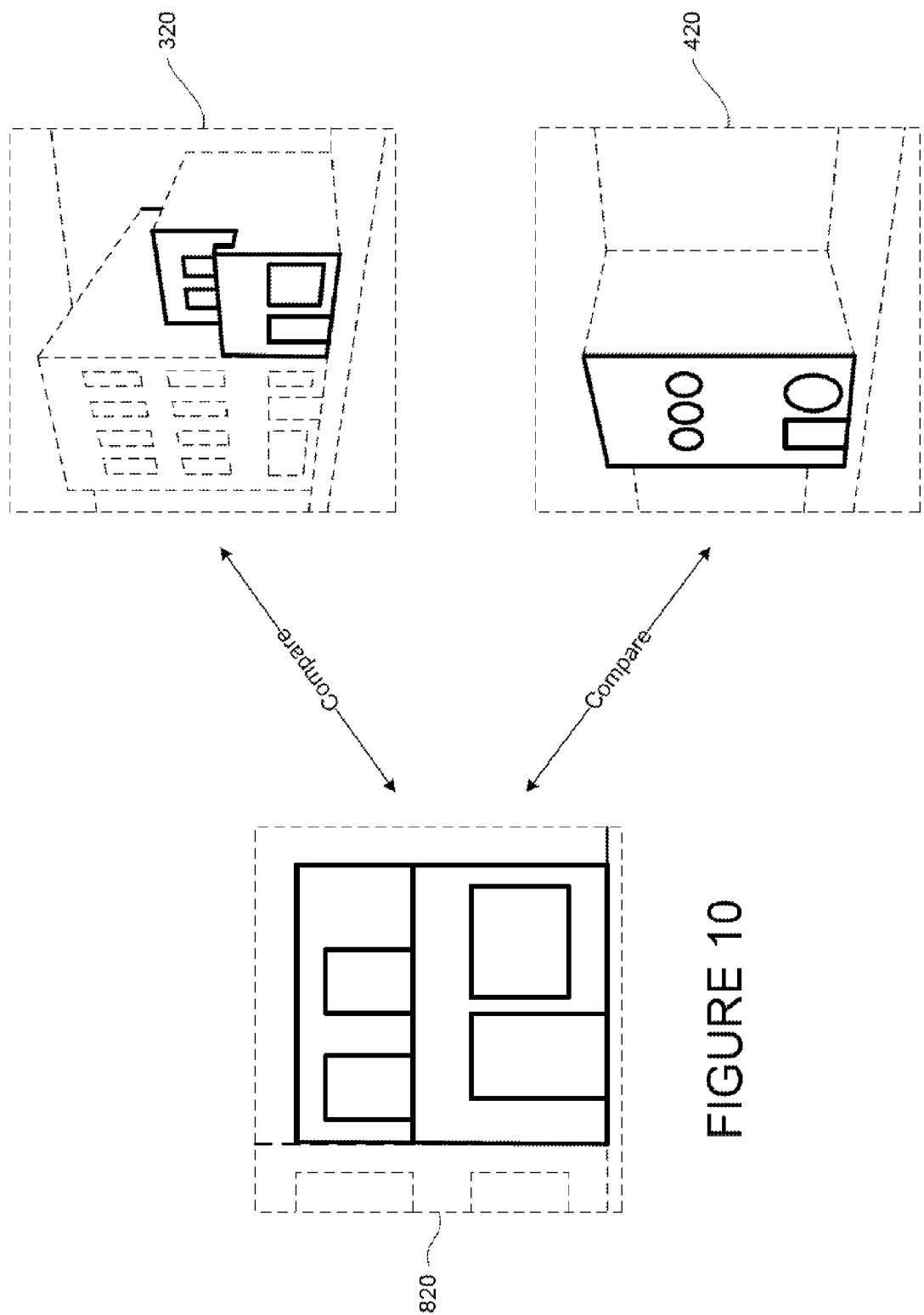
FIG. 10 illustrates a comparison of a known address image with known latitude/longitude images.

To test for matches, prominent features of the images may be identified. By way of example only, such features may include geometric shapes such as rectangles, circles and polygons. On a building, these shapes may indicate the outline of a building and the position of windows and doors. FIG. 10 shows, with thick black lines, just some of the prominent features that may be identified in the images 820 (which was pulled from the real estate website) and the street level images 320 and 420.

Figure 11:
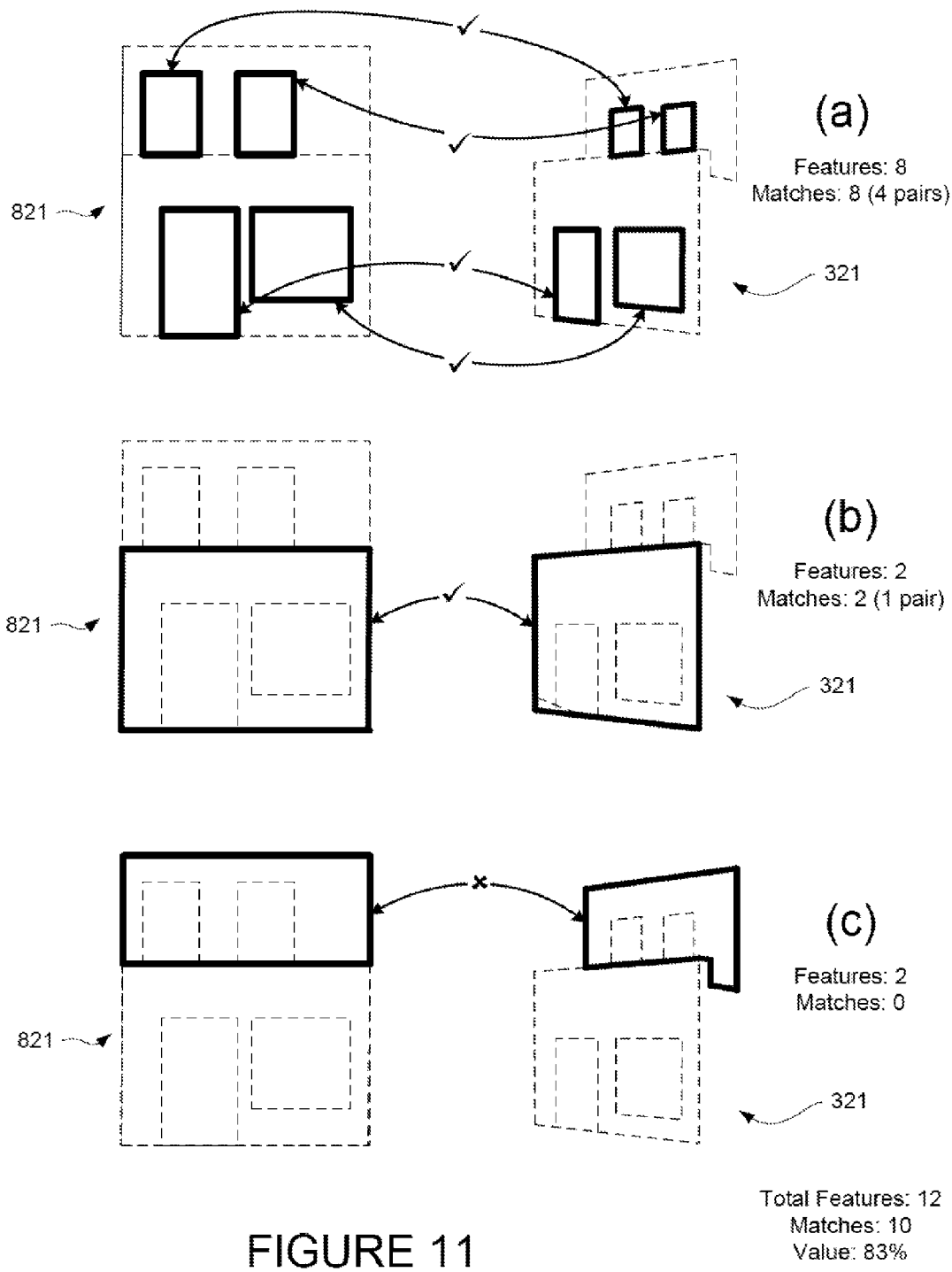
FIG. 11 illustrates a comparison of a portion of a known address image with a known latitude/longitude image.

The various features from the images are compared, such as by looking for features that match the shape and position with other similar features. FIG. 11 shows how portions 321 and 821 of images 320 and 820, respectively, may be compared with one another. As shown in FIG. 11(*a*), eight features were identified in the image 820 and street level image 320 and four of them sufficiently correspond in shape and position to be considered a match (indicated by the checkmark). Similarly, as shown in FIG. 11(*b*), two features are also found to match. The two features are not an identical match in terms of shape because one is generally rectangular while the one is generally trapezoidal. However, different camera angles of the same object may result in the same feature—in this case the bottom floor of a building—to form different shapes. Accordingly, one aspect of the system and method is preferably able to account for changes in size, rotation and skew.

Not all features will necessarily match. The feature shown in FIG. 11(*c*) corresponds with the portion of the second floor that faces the street. This particular feature comparison is deemed not to match because the shapes are simply too dissimilar in spite of the fact that they both correspond with the second floor of the same building.

The system and method ascribes a value that indicates the likelihood of the two images identifying the same geometric object. As shown in FIG. 11, the value may relate to the number of matching features compared to non-matching features, such as the number of matching features divided by the total number of features (83% in the case of FIG. 11). This value may be compared against a threshold, whereby exceeding the threshold indicates that the images match. Thus, if the threshold was 75%, the image portions 821 and 321 would be considered a match.

In that regard, the entire street level image 320 may be considered a match to the image 820 that was obtained from the real estate website. Alternatively, only the matching portion may be considered a match.

Figure 12:
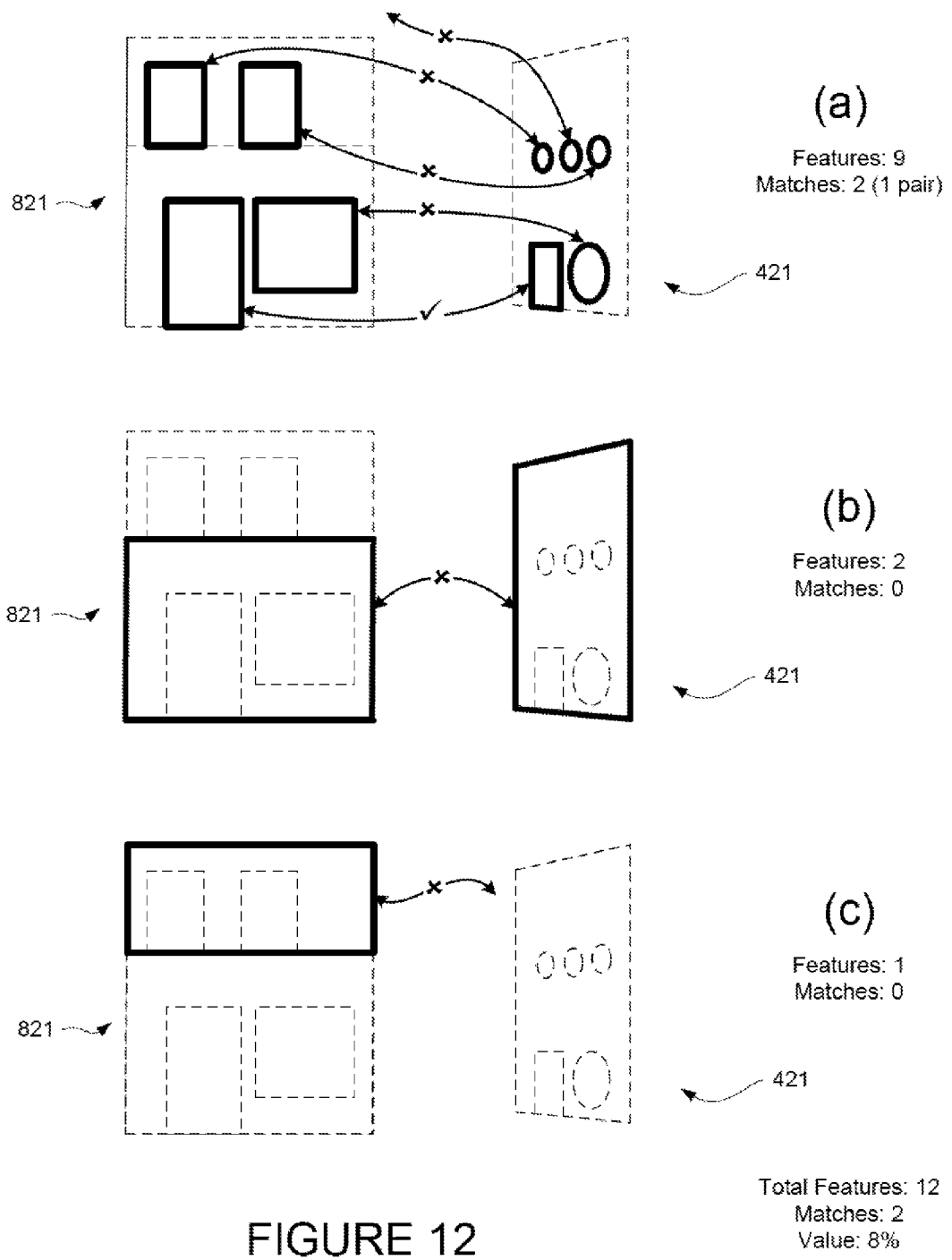
FIG. 12 illustrates a comparison of a portion of a known address image with a known latitude/longitude image.

FIG. 12 functionally illustrates a comparison of portions of the image from the real estate website with the other street level image. As shown in FIG. 12(*a*), most of the rectangular features in real estate image portion 821 have no match in a portion 321 of street level image 320 because the windows are shaped differently. Similarly, as shown in FIG. 12(*b*), while rectangular, the feature associated with the surface facing the street is also considered to be too dissimilar because one is short and wide and the other is tall and skinny. Yet further, there is simply no feature in image portion 421 that corresponds with the feature associated with the top floor of the building shown in image portion 821. Accordingly, image portion 421 is determined not to match image portion 821. If no other portions of street level image 420 match any portion of the real estate image 820, the entire street level image is considered not to match.

Figure 13:
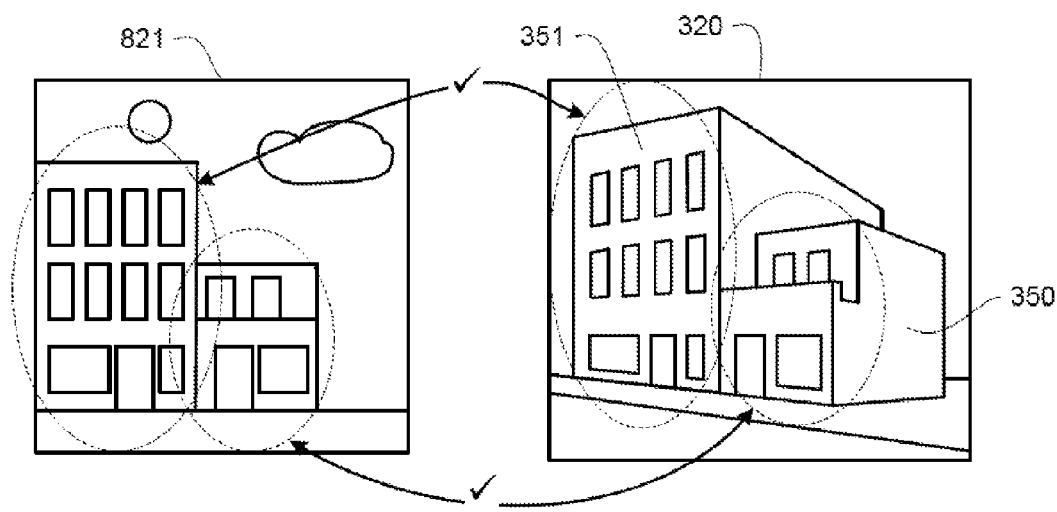
FIG. 13 illustrates a comparison of a known address image with a known latitude/longitude image.

If multiple known address images and known latitude/longitude images are available, they may be used as well. For example, as shown in FIG. 8, the web page for the property at 25 Second Street was found to include image 821 in addition to image 820. As shown in FIG. 13, this image may be compared with street level image 320, in which case the two buildings 350 and 351 captured in street level image 320 may be found to match both of the buildings in the image 821.

Various systems and method may be used to compare the images. By way of example only, sets of scale-invariant feature transform (SIFT) may be computed on a pair of images and used to generate a value indicative of the images' similarity. The system and method may analyze the number of matching features that are geometrically consistent somewhere in both images using any number of different geometric models, such as affine, homography or projective geometry transformations. Yet further, features may be identified by looking for edges, where edges are further identified by quick changes in color. Moreover, the techniques described in A. Oliva and A. Torralba, "Building the gist of a scene: The role of global image features in recognition. Visual perception. Progr. Brain Res.," 155:23-36, 2006, as well as H. Neven, G. Rose and W. Macready, "Image recognition with an adiabatic quantum computer I. Mapping to quadratic unconstrained binary optimization," arXiv:0804.4457v1, may also be used.

There may be many street level images proximate to a street address's expected latitude/longitude position. By way of example only, there may three or more street level images that capture building 350 from many different angles. All of the street level images near the expected latitude/longitude position may be compared with all of the known address images of the street address. The various comparisons may then be applied to a formula in order to determine whether street level image(s) have captured the geographic object at the street address.

Yet further, if a matching object is found in different places in different images from different camera angles and camera positions, the latitude/longitude of the object may be determined with more precision based on the angles and camera positions.

Moreover, some street level image may be associated with a depth map that defines the latitude/longitude/altitude position of each object at each pixel in the street level image. These depth maps may be obtained in a variety of ways, including mounting laser sensors on a vehicle or image processing with stereo and structure—from motion methods. Accordingly, because the pixel position of the matching object is known, the latitude/longitude of a street address can be determined with even greater precision. Moreover, the availability of 3D provides yet another criteria to use for matching, which will increase the accuracy of looking for matches in many circumstances. Yet further, if the known address image matches several known latitude/longitude images, the position of the objects within 3D space may be used to calculate a value indicative of whether the multiple images correspond with same object (thus increasing the confidence of a correct match).

Figure 14:
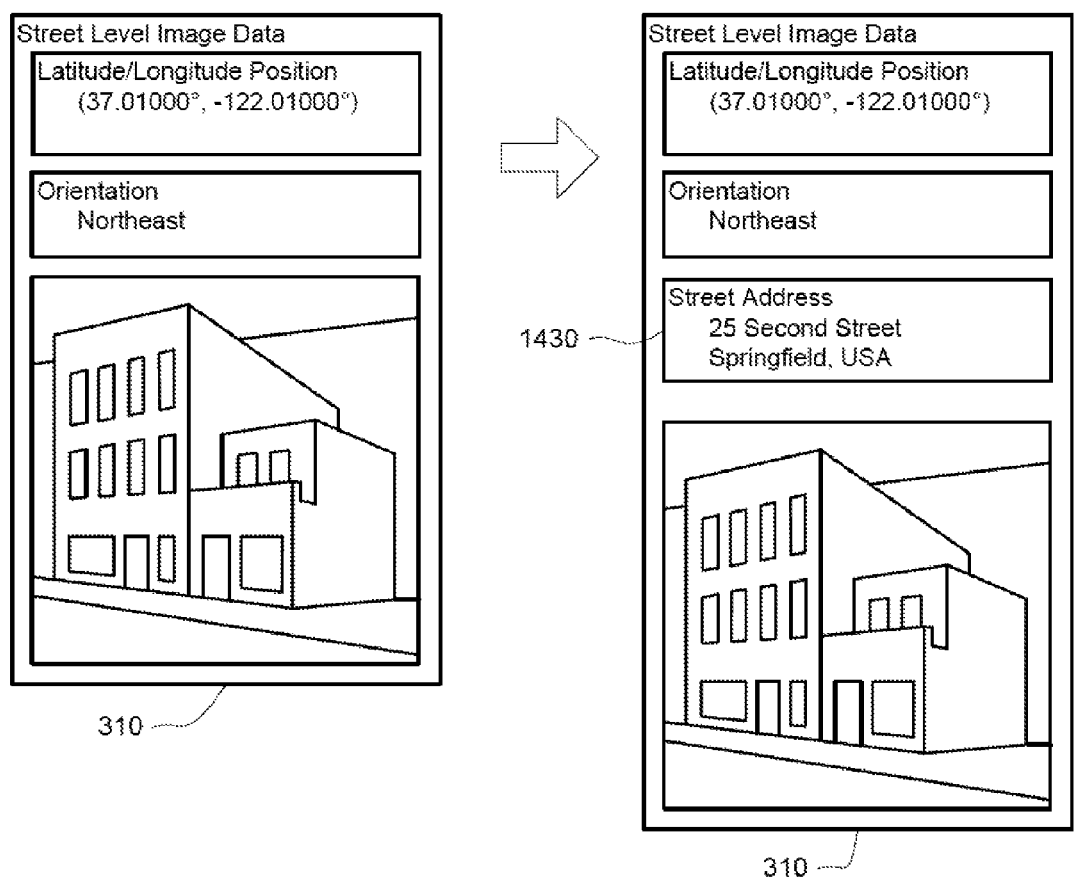
FIG. 14 is a functional diagram of updating street level image data.
Figure 15:
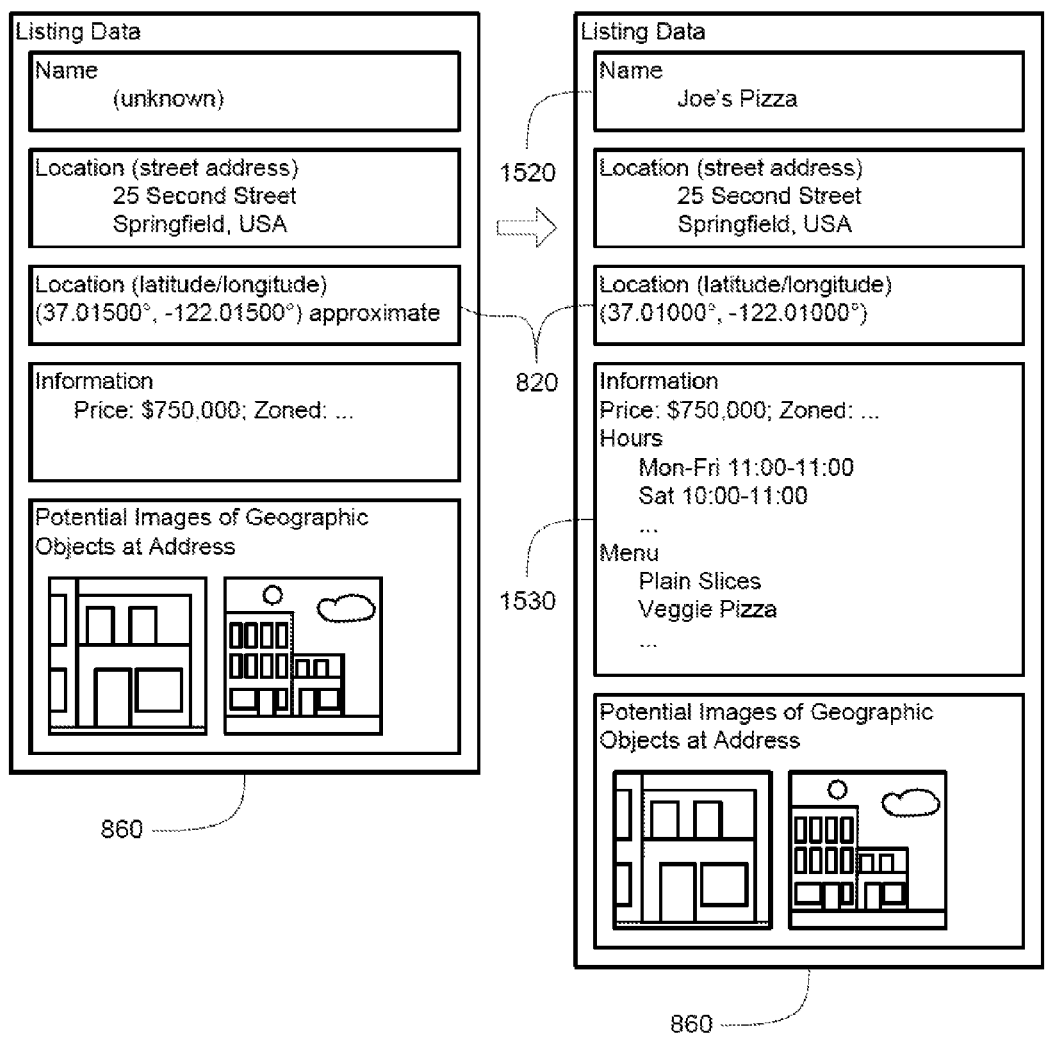
FIG. 15 is a functional diagram of updating listing data.

When a match is found, a variety of information in the system and method may be updated. For example, as shown in FIG. 14, the data 310 representing the matching street level image may be updated to become associated with a street address 1430 or range of street addresses. As shown in FIG. 15, the latitude/longitude location 820 of the listing 860 that was created from the real estate site may be updated from approximate to known based on the latitude/longitude of the matching known street level image. In addition, the geocoding database 265 shown in FIG. 1 may be updated with the new street address and latitude/longitude, which will allow not only more accurate conversions at the particular street address, but will also more accurate estimates when converting neighboring locations.

As noted in FIG. 15, other information may be used to update the listing as well. For example, when the server 110 parsed the web page 710 from the pizza restaurant (FIG. 7), the server may have noted that it already had a listing for 25 Second Street. Accordingly, the server may further update the name 1520 of the listing 860 (FIG. 15) to include the name 720 of the business ("Joe's Pizza") that was found on the other webpage.

In one aspect of the system and method, the allocation of street addresses is used to provide annotations to users.

Figure 16:
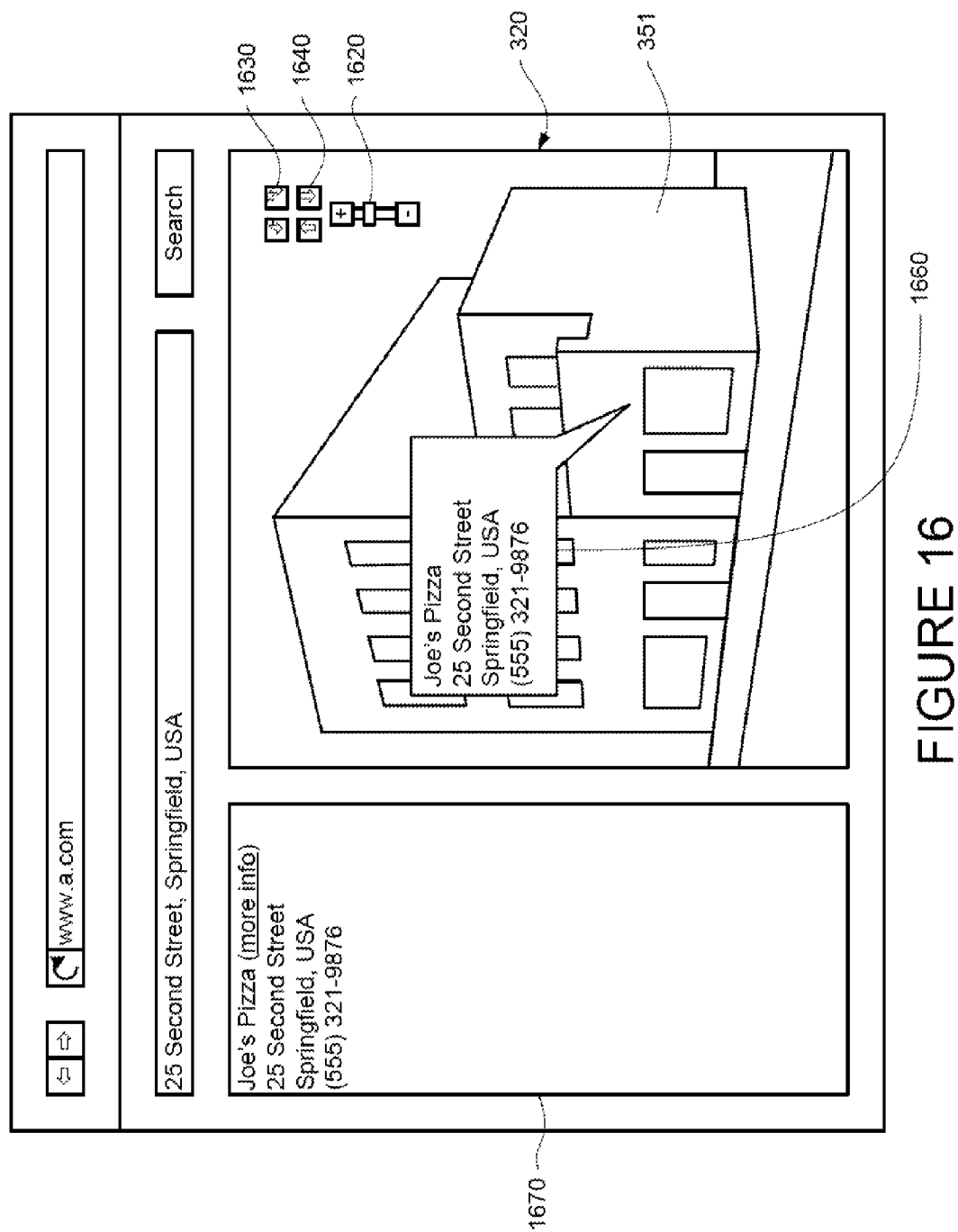
FIG. 16 is a screen shot of an annotated street level image.

As shown in FIG. 16, the street level image 320 may be shown on the client device's display in a browser along with user-selectable controls for changing the location or orientation of the viewpoint. The controls may include controls 1620 for zooming the image in and out, as well as controls 1630 to change the orientation of the view, such as changing the direction from looking northeast to looking northwest. If the street level image was downloaded as an entire 360° panorama, changing the direction of the view may necessitate only displaying a different portion of the panorama without retrieving more information from the server. The user may also change the location of the viewpoint. For example, the user may move the viewpoint forwards or backwards in the currently-viewed direction by selecting controls 1640. Other navigation controls may be included as well, such as controls in the form of arrows disposed along a street that may be selected to move the vantage point up or down the street. A user may also operate the arrow controls of a keyboard to change the zoom, direction or location of the view. A user may further select portions of the image, such as by moving and clicking a computer mouse or tapping a touch-sensitive screen, to select and move closer to the objects displayed in the image.

When the street level image is displayed, the client device may further retrieve the street address based on the latitude/longitude of the currently-viewed street level image. For example, the server may check the street level image data to see if it refers to the street address of the objects shown in the image. If the listing is associated with a business or the like (determined by searching the listing database), the browser may further display information about the listing in a pop-up window 1660 or in textbox 1670.

Accordingly, as shown in FIG. 16, the annotation may reflect information obtained from a number of different sources. By matching the street level image with an image obtained from a real estate website, the street level image became associated with a street address. Because a pizzeria's website referred to the same street address, additional information was obtained from the pizzeria's website. All of the information, namely the street level image, the street address and the additional information are then shown to the user.

Figure 17:
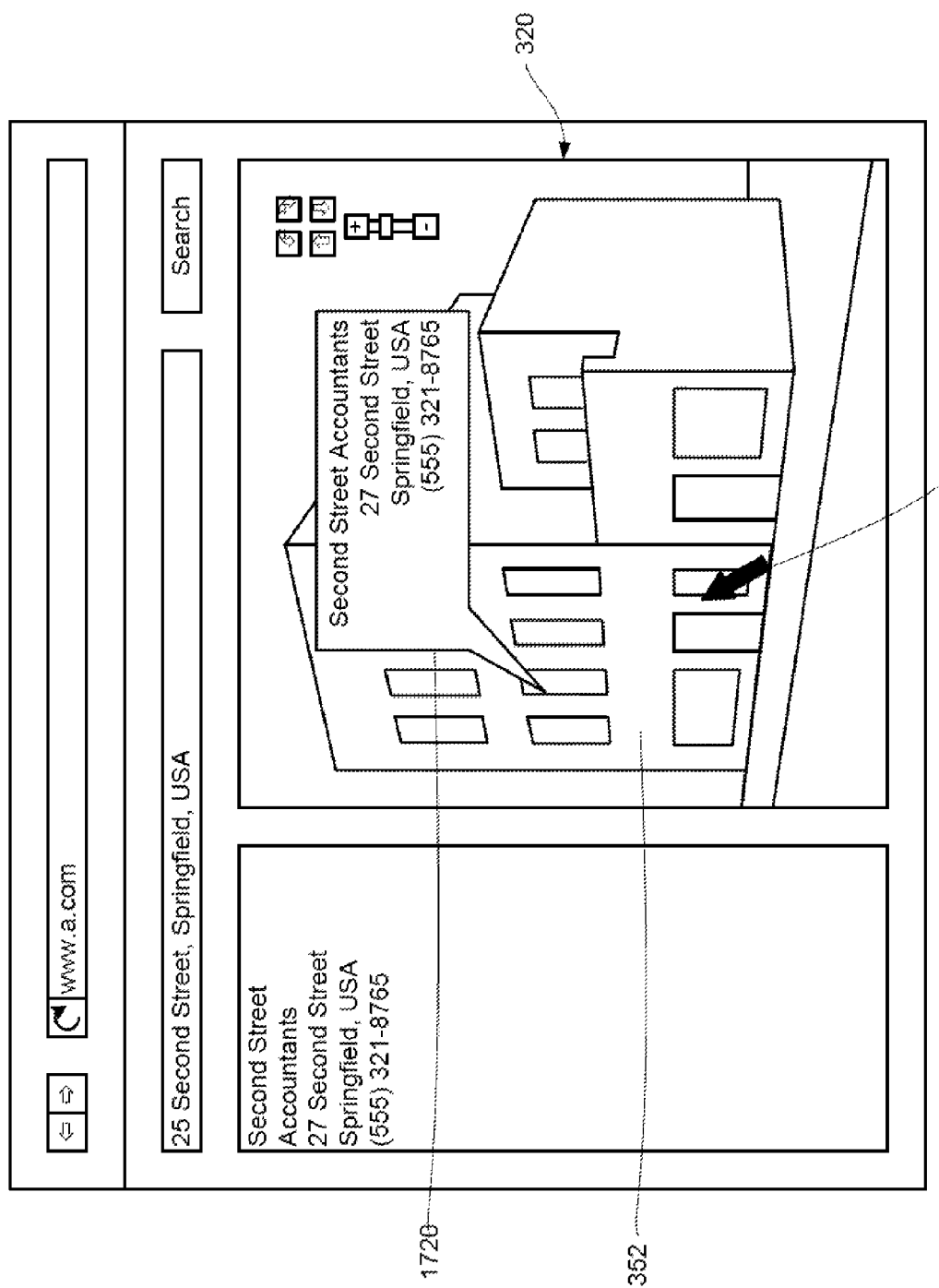
FIG. 17 is a screen shot of an annotated street level image.

As shown in FIG. 17, the latitude/longitude position may be used to estimate the street address of neighboring objects as well, such as showing listing information in a popup 1720 when the mouse cursor 1710 hovers over building 352 in the street level image 320. If multiple listings are associated with the same address, such as in an office building, an annotation defining all of the businesses may be shown.

Figure 18:
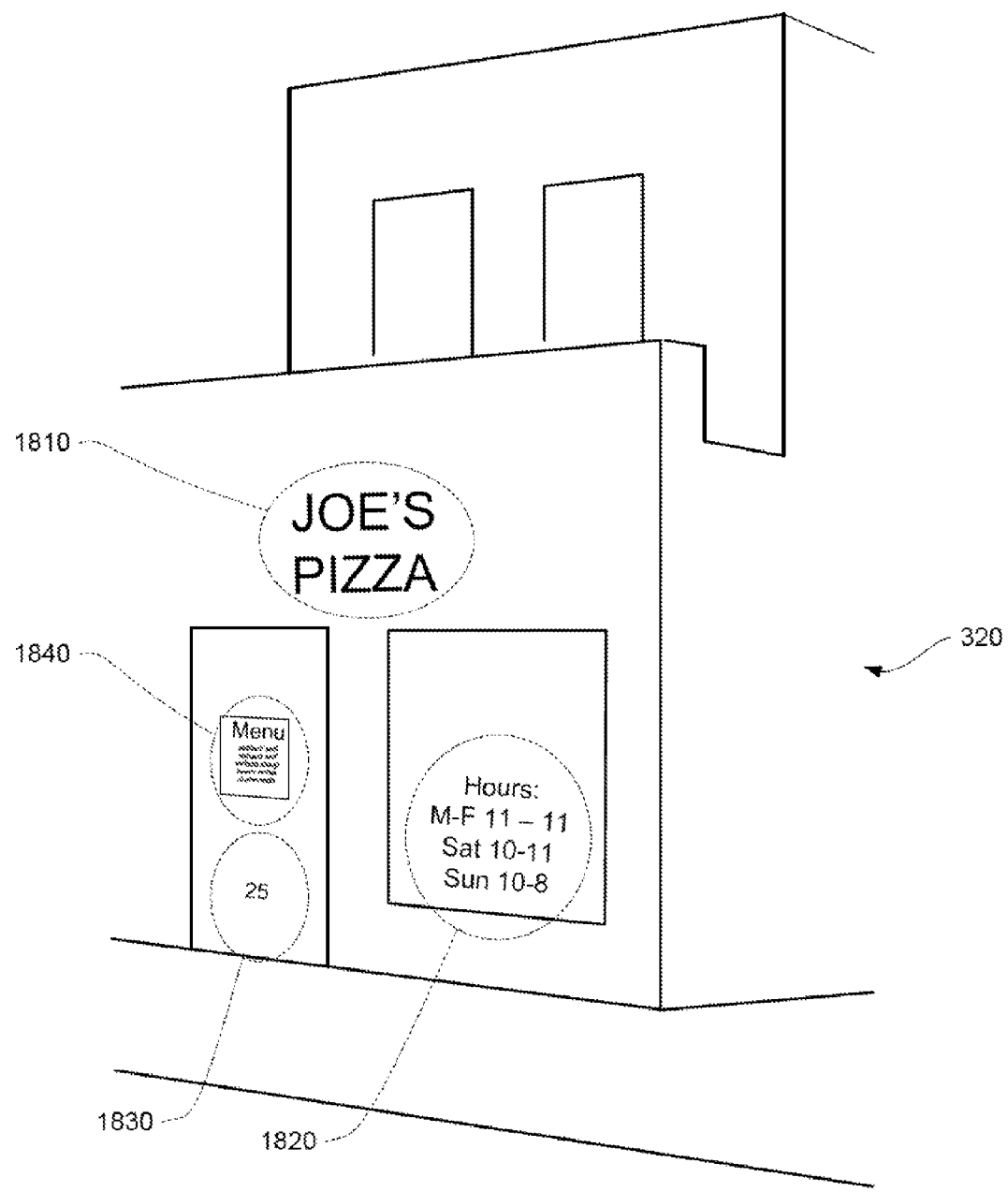
FIG. 18 illustrates a portion of a street level image containing text.

In yet another aspect of the system and method, text that has been captured in the street level image is extracted from the image, such as by optical character recognition (OCR), and added to the listing information and annotation. A close up view of a portion of street level image 320 is shown in FIG. 18. The information on the building includes the name 1810 of the business, its hours 1820 of operation, its street number 1830 and a menu 1840. As shown in FIG. 15, this information may be added to the existing information 1530 associated with the listing data 860 that corresponds the latitude/longitude of the street level image.

Moreover, the extracted text may be used to confirm or negate the street address/latitude longitude association that was made by image matching. For example, the server 110 may compare the extracted text with information contained in the listing data 860 for the street address. For example, in addition to matching image features as described above, the server 110 may further attempt to match text extracted from the street level image with text stored in the listing data 860. If there is a match (such as "Joe's Pizza" and "25" appearing both on the building and in the listing data), this may be factored into whether the latitude/longitude of the street level image is associated with the street address associated with the real estate image.

Figure 19:
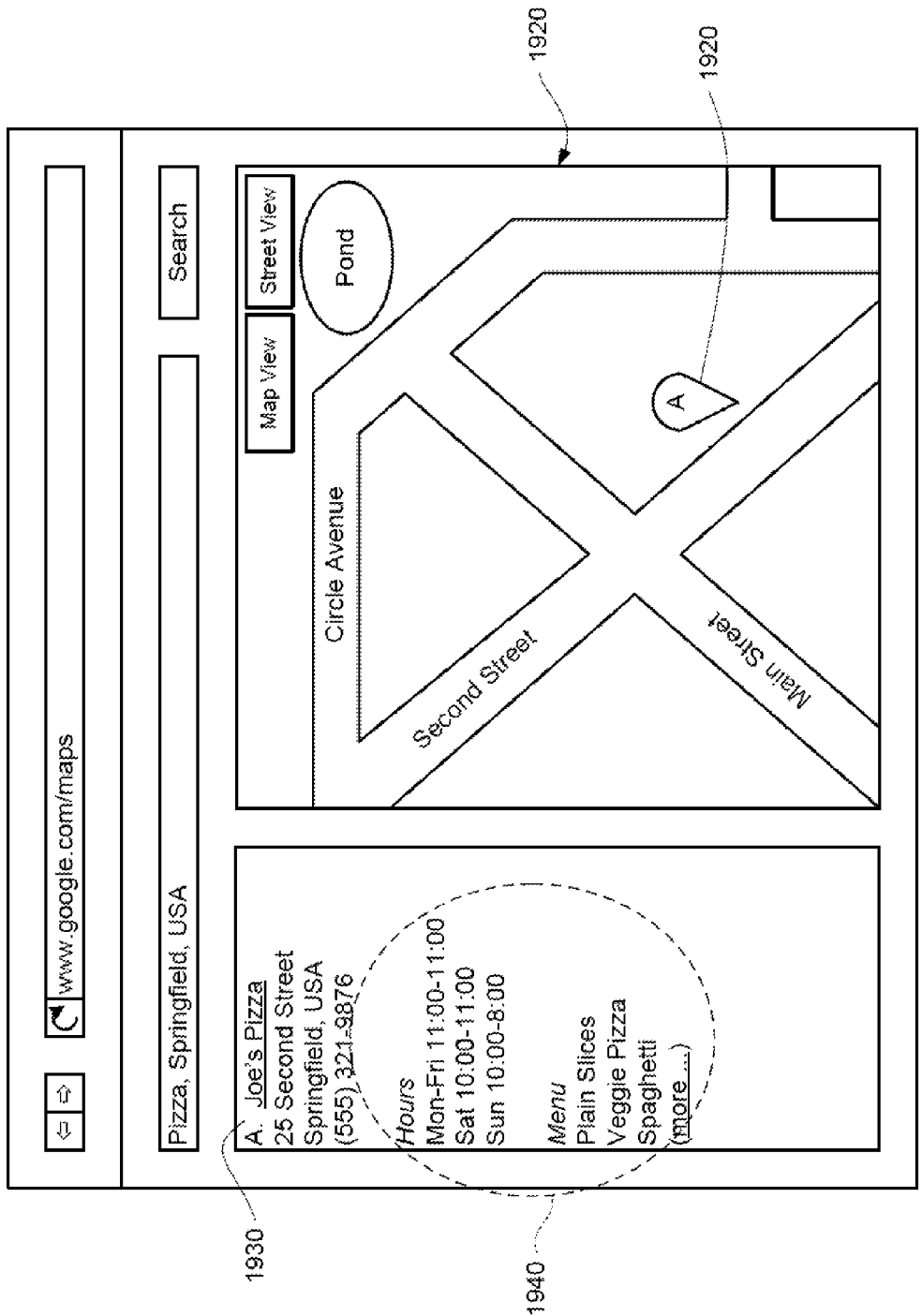
FIG. 19 is a screen shot of annotated map.
Figure 20:
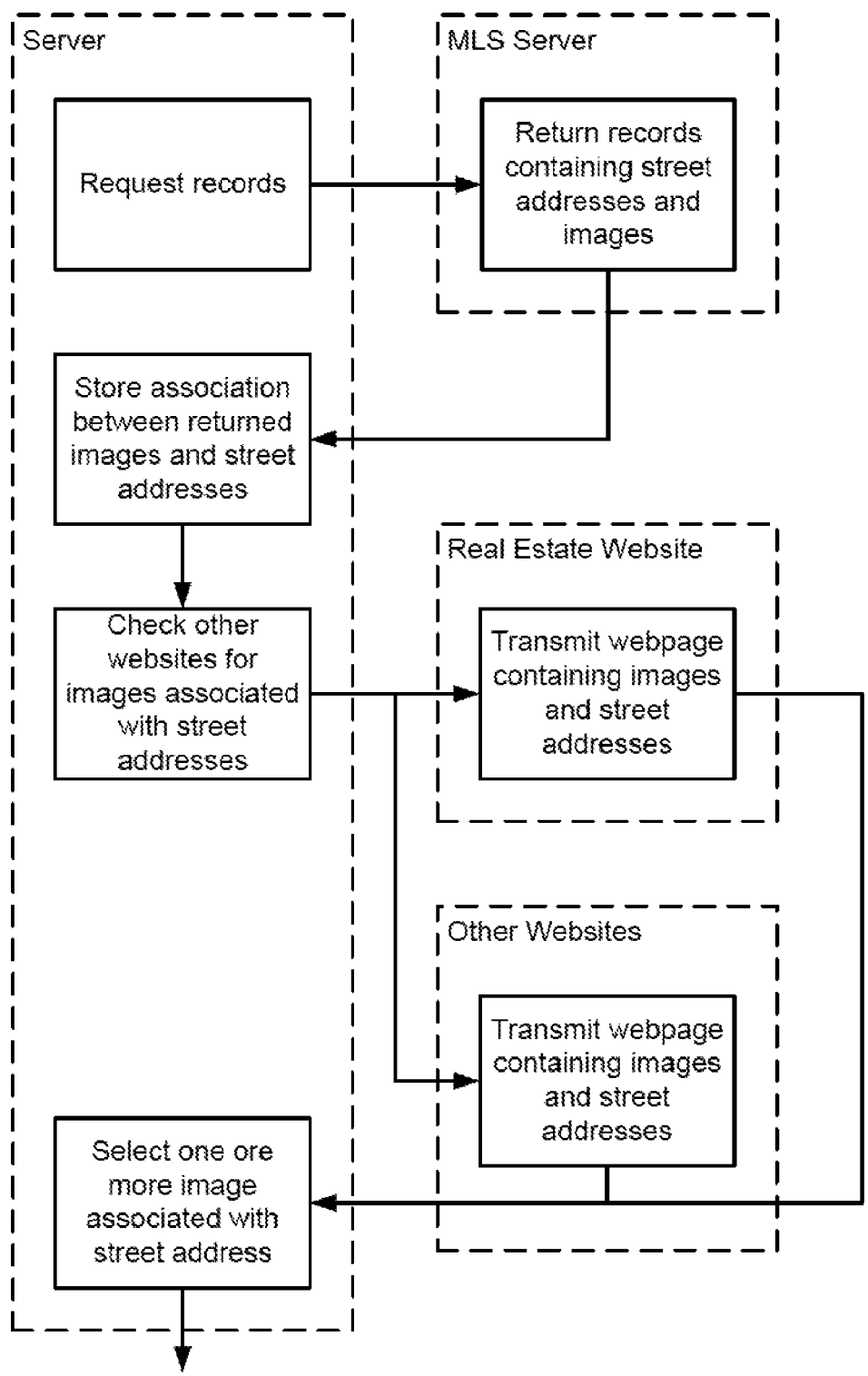
FIG. 20 is a flowchart.
Figure 22:
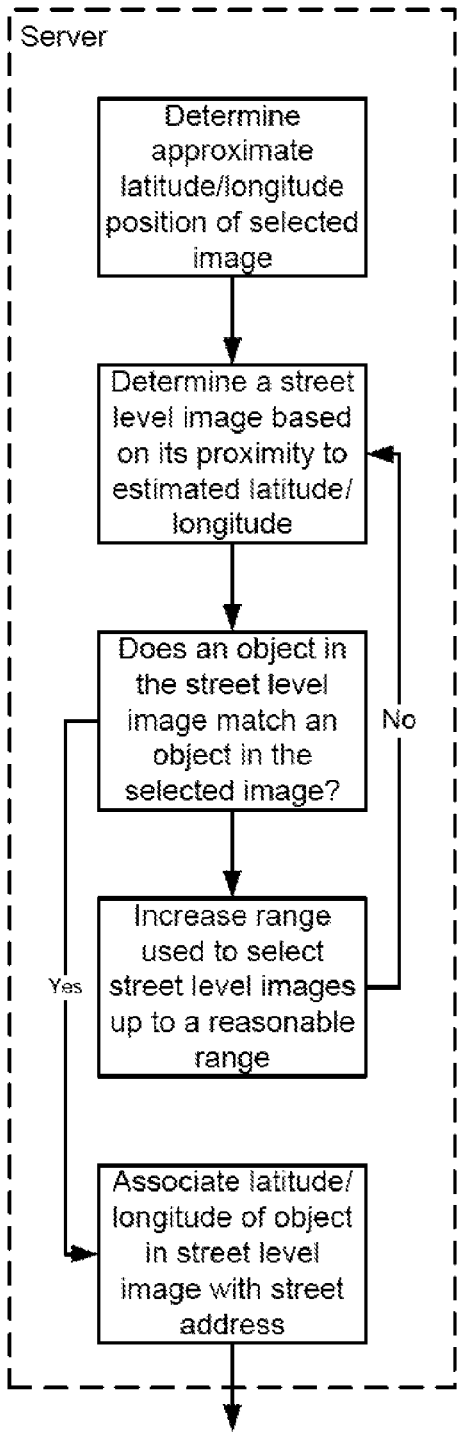
FIG. 22 is a flowchart.
Figures 22, 23:
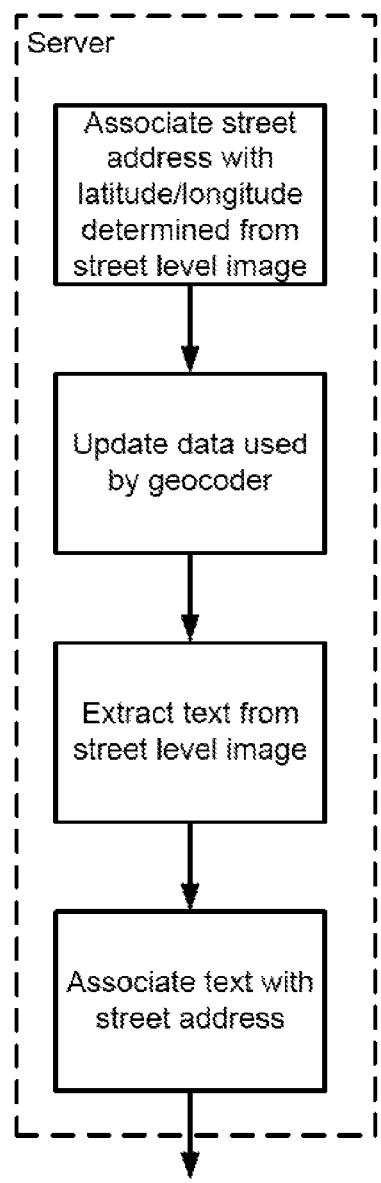
FIG. 23 is a flowchart.
Figure 23:
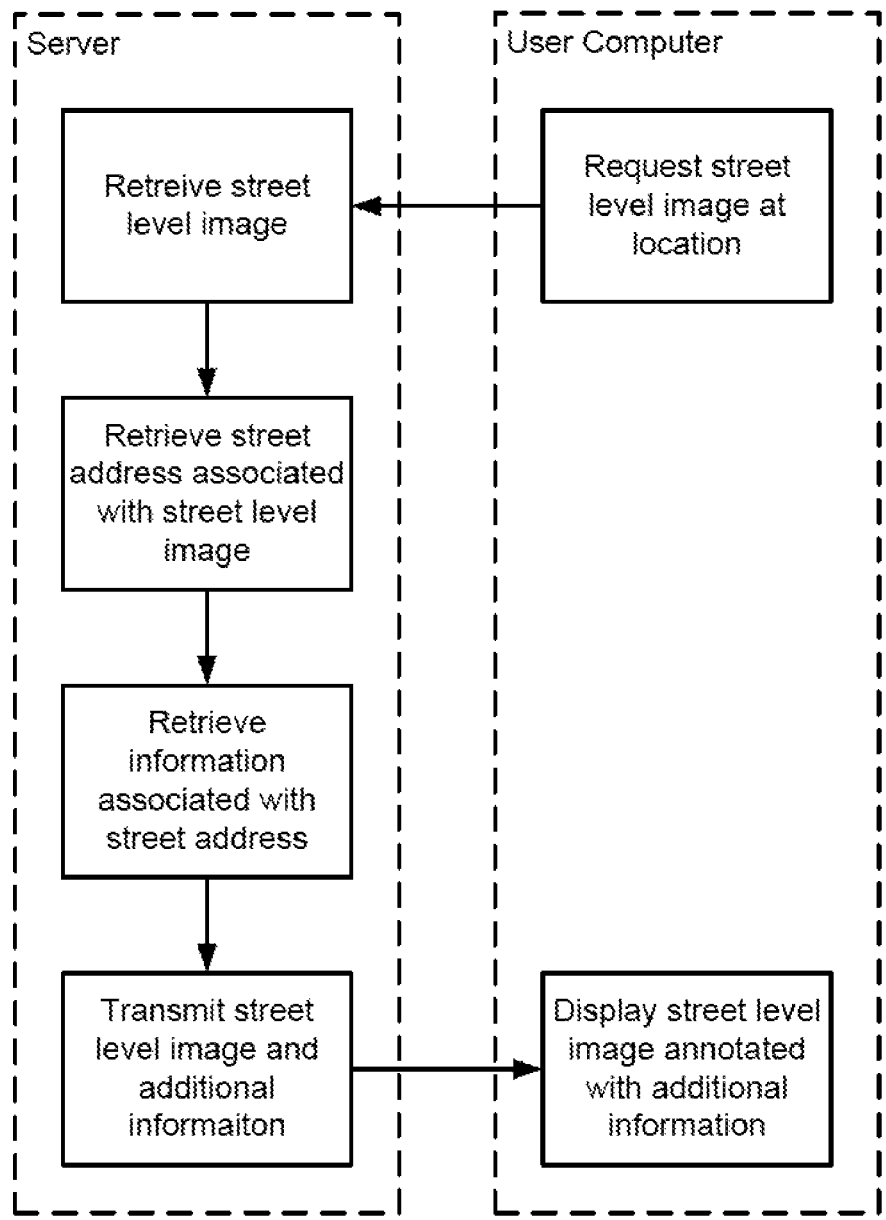

One aspect of the system and method permits the image matching to enhance views that do not even include street level image images. FIG. 19 shows a top-down map 1910 that was displayed on the client device when the user searched pizza in Springfield. The location of the search result is shown on the map as an icon 1920 along with text 1930 taken from the listing data. The text may include information 1940 that was extracted from the street level image.

Another aspect of the system and method relates to associatively joining data together based on the similarity of images, particularly where the images are associated with different reference systems. For example, the system and method may have access to a set of first images of buildings, where the first images are associated with business names and street address. The system and method may also have access to a set of second images of buildings, where the second images are associated with latitude/longitude locations and text extracted from the second images (such as store hours painted on a door). A processor approximates latitude/longitude locations from the street addresses, or vice versa, and selects one or more of the first images for comparison with one or more of the second images based on the image location's proximity to the approximated location. If there is a sufficient visual similarity between the selected first and second images, the data from the first and second images may be associated with one another, such as associating the business name with the hours.

Accordingly, when a user requests information that would pull up the first data, the second data is provided as well and vice versa. For example, if the user searched for pizza and the search results included "Joe's Restaurant", the processor may provide the user with the restaurant's hours as well (e.g., word "pizza" is associated with the name "Joe's Restaurant," the name "Joe's Restaurant" is associated with a street address and a picture on a website, one of the buildings in the picture is determined to be visually similar to a street level image, the street level image is associated with a latitude/longitude that is estimated to be near the street address, and the street level image captured a door having business hours painted on it). Similarly, if the user were searching for stores that are open at a particular time, the user may be informed of the pizza restaurant. Moreover, the visual similarity of first and second images may be used to establish one-to-many, many-to-one, or many-to-many relationships between the first and second data associated with those images.

The system and method may also be used in conjunction with video and the other aspects disclosed in U.S. patent application Ser. No. 12/431,279 filed on Apr. 28, 2009, the entire disclosure of which is incorporated herein by cross-reference.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A method, comprising:
   receiving, using one or more processors, a first image from a first set of images depicting objects at a location, the first set of images including data related to the depicted objects;
   selecting, using the one or more processors, a second image from a second set of images, the second set of images depicting objects at the location;
   determining, using the one or more processors, whether a first object depicted in the first image and a second object depicted in the second image correspond; and
   when it is determined that the first object and the second object correspond, identifying, using the one or more processors, update data from the second image to be used to modify the data related to the first object in the first image.

2. The method of claim 1, wherein position data related to the second image overlaps with position data related to the first image.

3. The method of claim 1, wherein determining whether the first object and the second object correspond includes comparing one or more features of the first object in the first image with one or more features of the second object in the second image.

4. The method of claim 3, wherein the comparing further includes determining whether the one or more features of the first object geometrically correspond to the one or more features of the second object.

5. The method of claim 3, wherein the comparing further includes determining whether the one or more features of the first object visual correspond to the one or more features of the second object.

6. The method of claim 3, wherein the comparing further includes determining whether a number of features that correspond between the first object and second object meet a threshold level.

7. The method of claim 3, wherein the one or more features include at least one of a size, position, camera angle, rotation, and skew of the first and second objects.

8. The method of claim 1, further comprising:
   identifying, using the one or more processors, text related to the second object in the second image; and
   updating, using the one or more processors, the data describing the first object in the first image with the identified text.

9. The method of claim 8, further comprising:
   receiving, using the one or more processors, a request for the first image from the first set of images; and
   providing, using the one or more processors, at least some of the extracted text from the second image from the second set of images.

10. A non-transitory computer-readable storage medium on which computer readable instructions of a program are stored, the instructions, when executed by one or more processors, cause the one or more processors to perform a method comprising:
    receiving, using the one or more processors, a first image from a first set of images from memory depicting objects at a location, the first set of images including data related to the depicted objects;
    selecting, using the one or more processors, a second image from a second set of images, the second set of images depicting objects at the location;
    determining, using the one or more processors, whether a first object depicted in the first image and a second object depicted in the second image correspond; and
    when it is determined that the first object and the second object correspond, identifying, using the one or more processors, update data from the second image to be used to modify the data related to the first object in the first image.

11. The non-transitory computer-readable storage medium of claim 10, wherein position data related to the second image overlaps with position data related to the first image.

12. The non-transitory computer-readable storage medium of claim 10, wherein determining whether the first object and the second object correspond includes comparing one or more features of the first object in the first image with one or more features of the second object in the second image.

13. The non-transitory computer-readable storage medium of claim 12, wherein the comparing further includes determining whether the one or more features of the first object geometrically correspond to the one or more features of the second object.

14. A processing system, comprising:
    a memory for storing images; and
    one or more processors coupled to the memory, the one or more processors being configured to:
    receive a first image from a first set of images from memory depicting objects at a location, the first set of images including data related to the depicted objects;
    select a second image from a second set of images, the second set of images depicting objects at the location;
    determine whether a first object depicted in the first image and a second object depicted in the second image correspond; and when it is determined that the first object and the second object correspond, identify update data from the second image to be used to modify the data related to the first object in the first image.

15. The system of claim 14, wherein position data related to the second image overlaps with position data related to the first image.

16. The system of claim 14, wherein to determine whether the first object and the second object correspond, the one or more processors are further configured to compare one or more features of the first object with one or more features of the second object.

17. The system of claim 16, wherein to compare the one or more processors are further configured to determine whether the one or more features of the first object geometrically correspond to the one or more features of the second object.

18. The system of claim 16, wherein to compare the one or more processors are further configured to determine whether the one or more features of the first object visual correspond to the one or more features of the second object.

19. The system of claim 16, wherein to compare the one or more processors are further configured to determine whether a number of features that correspond between the first object and second object meet a threshold level.

20. The system of claim 16, wherein the one or more features include at least one of a size, position, camera angle, rotation, and skew of the first and second objects.

\* \* \* \* \*